United States Patent
Joo et al.

(10) Patent No.: US 9,879,363 B2
(45) Date of Patent: Jan. 30, 2018

(54) METHOD FOR PREPARING A NANOFIBER OR NON-WOVEN MAT

(71) Applicant: CORNELL UNIVERSITY, Ithaca, NY (US)

(72) Inventors: Yong Lak Joo, Ithaca, NY (US); Daehwan Cho, Austin, TX (US); Alexander Naydich, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 382 days.

(21) Appl. No.: 14/385,806

(22) PCT Filed: Mar. 15, 2013

(86) PCT No.: PCT/US2013/031906
§ 371 (c)(1),
(2) Date: Sep. 17, 2014

(87) PCT Pub. No.: WO2013/142306
PCT Pub. Date: Sep. 26, 2013

(65) Prior Publication Data
US 2015/0044464 A1    Feb. 12, 2015

Related U.S. Application Data

(60) Provisional application No. 61/612,444, filed on Mar. 19, 2012, provisional application No. 61/717,163, filed on Oct. 23, 2012.

(51) Int. Cl.
*D01F 1/02* (2006.01)
*D01F 1/09* (2006.01)
(Continued)

(52) U.S. Cl.
CPC ............... *D01F 6/18* (2013.01); *B01D 39/08* (2013.01); *B01D 67/0079* (2013.01);
(Continued)

(58) Field of Classification Search
CPC .. D01D 5/0007; D01D 5/0015; D01D 5/0023; D01D 5/003; D01D 5/0038;
(Continued)

(56) References Cited

U.S. PATENT DOCUMENTS 7,662,332 B2    2/2010    Chu et al.
2005/0287239 A1    12/2005    Joo et al.
(Continued)

OTHER PUBLICATIONS

International Search Report Form PCT/ISA/220, International Application No. PCT/US2013/031906, dated Jun. 26, 2013, pp. 1-15.

*Primary Examiner* — Leo B Tentoni
(74) *Attorney, Agent, or Firm* — Bond, Schoeneck & King, PLLC; William Greener; Alek Szecsy

(57) ABSTRACT

Described herein are nanofibers and methods for making nanofibers that include any one or more of (a) a non-homogeneous charge density; (b) a plurality of regions of high charge density; and/or (c) charged nanoparticles or chargeable nanoparticles. In one aspect, the present invention fulfills a need for filtration media that are capable of both high performance (e.g., removal of particle sizes between 0.1 and 0.5 ?m) with a low pressure drop, however the invention is not limited in this regard.

19 Claims, 12 Drawing Sheets

(51) Int. Cl.
- *D01F 6/18* (2006.01)
- *D01D 5/00* (2006.01)
- *D04H 1/728* (2012.01)
- *D01F 1/10* (2006.01)
- *B01D 67/00* (2006.01)
- *B01D 69/14* (2006.01)
- *B01D 71/42* (2006.01)
- *D04H 3/009* (2012.01)
- *B01D 39/08* (2006.01)
- *D01F 6/14* (2006.01)
- *D01F 9/08* (2006.01)
- *B01D 71/02* (2006.01)
- *B01D 71/38* (2006.01)

(52) U.S. Cl.
CPC .......... *B01D 69/148* (2013.01); *B01D 71/42* (2013.01); *D01D 5/003* (2013.01); *D01D 5/0007* (2013.01); *D01D 5/0023* (2013.01); *D01F 1/10* (2013.01); *D01F 6/14* (2013.01); *D01F 9/08* (2013.01); *D04H 1/728* (2013.01); *D04H 3/009* (2013.01); *B01D 71/024* (2013.01); *B01D 71/38* (2013.01); *B01D 2323/39* (2013.01); *D01D 5/0069* (2013.01); *D10B 2321/06* (2013.01); *D10B 2321/10* (2013.01); *D10B 2505/04* (2013.01); *Y10T 428/298* (2015.01); *Y10T 428/2933* (2015.01)

(58) Field of Classification Search
CPC ........... D01D 5/0046; D01F 1/02; D01F 1/09; D01F 1/10; D01F 9/08
USPC .................... 264/464, 465, 466, 484
See application file for complete search history.

(56) References Cited

U.S. PATENT DOCUMENTS

| | | | |
|---|---|---|---|
| 2006/0138711 A1* | 6/2006 | Bryner | D01D 5/0092 264/465 |
| 2008/0264259 A1 | 10/2008 | Leung | |
| 2011/0151255 A1 | 6/2011 | Kim et al. | |
| 2011/0151736 A1* | 6/2011 | Lee | D03D 15/0061 442/189 |
| 2011/0163035 A1 | 7/2011 | Cheng et al. | |
| 2011/0310465 A1* | 12/2011 | Takanashi | D04H 1/728 359/296 |
| 2012/0003524 A1* | 1/2012 | Jo | D01F 9/08 429/144 |
| 2012/0295097 A1* | 11/2012 | Lotus | D01D 5/0007 428/317.9 |

* cited by examiner

METHOD FOR PREPARING A NANOFIBER OR NON-WOVEN MAT

CROSS-REFERENCE

This application claims the benefit of U.S. Provisional Application Nos. 61/612,444, filed Mar. 19, 2012 and 61/717,163, filed Oct. 23, 2012, both of which are incorporated herein by reference in their entireties.

BACKGROUND OF THE INVENTION

Nonwoven filter media are generally composed of randomly oriented fibers with diameters of about a few dozen micrometers. Although nonwoven filter media can achieve high filtration efficiency (e.g., removing approximately 90% of micron-sized particles), they are generally limited to use in pre-filters and are not used further downstream as high performance filters. Particularly, the most penetrating particle size between 0.1 and 0.5 µm are not removed by the present nonwoven filter media because the size of pores formed with micron-scale fibers is considerably larger. To enhance the filtration efficiency of the filter media, one generally makes much thicker media for smaller pore sizes. However, thicker filter media can be difficult to use due to increased pressure drop, and thus higher energy cost. Additionally, fibers and non-woven fibers are investigated for potential uses in other areas.

SUMMARY OF THE INVENTION

In certain embodiments, provided herein are nanofibers, including non-woven nanofiber mats. In some embodiments, the nanofibers comprise a continuous matrix material along with discrete domains of a second material. In certain instances, the discrete domains comprise domains of high charge density. In some embodiments, the discrete domains comprise nanoparticles (e.g., charged or chargeable nanoparticles). In certain embodiments, the nanoparticles are metal, metal oxide, or ceramic nanoparticles. In certain instances, wherein the domains and/or nanoparticles are charged or chargeable domains and/or nanoparticles, the nanofibers are useful in filter media. In other instances, the nanoparticles are not charged and may be used in other technologies (e.g., chemistries, such as catalytic chemistries, at the discrete domains of the fibers).

In one aspect, the present invention fulfills a need for filtration media that are capable of both high performance (e.g., removal of particle sizes between 0.1 and 0.5 µm) with a low pressure drop, however the invention is not limited in this regard. Described herein are nanofibers and methods for making nanofibers comprising any one or more of (a) a non-homogeneous charge density; (b) a plurality of regions of high charge density; and/or (c) charged nanoparticles or chargeable nanoparticles.

In one aspect, described herein are nanofibers comprising any one or more of: (a) a non-homogeneous charge density; (b) a plurality of regions of high charge density; and/or (c) charged and/or chargeable nanoparticles.

In some embodiments, the standard deviation of charge density of the nanofiber is at least 300% of the net charge density of the nanofiber. In some embodiments, the standard deviation of charge density is calculated from a plurality of substantially uniformly distributed regions of the nanofiber. In some embodiments, the average thermally stimulated current (TSC) of the nanofiber is at least 200% of the TSC of the nanofiber without charged nanoparticles or chargeable nanoparticles. In some embodiments, the charge density of the region of high charge density is at least 300% of the net charge density of the nanofiber.

In some embodiments, the regions of high charge density have an average diameter of about 10 nm. In some embodiments, the regions of high charge density are separated by at most 0.05 µm on average. In some embodiments, the regions of high charge density comprise at most 5% of the volume of the nanofiber. In some embodiments, the regions of high charge density comprise at most 5% of the area of the nanofiber.

In some embodiments, the regions of high charge density are distributed substantially uniformly on the nanofiber.

In some embodiments, a collection of the nanofibers has a thermally stimulated current (TSC) between about $10^{-13}$ and $10^{-12}$ Amp per $5 \times 10^{-4}$ $m^2$ of surface area. In some embodiments, a collection of the nanofibers has a thermally stimulated current (TSC) between about $10^{-13}$ and $10^{-12}$ Amp per $5 \times 10^{-4}$ $m^2$ of surface area, wherein the collection has a thickness of 20 microns and a porosity of 0.5.

In some embodiments, each of the plurality of regions of high charge density comprises a nanoparticle. In some embodiments, the metal oxide is selected from the group consisting of MgO, $TiO_2$, CuO, ZnO and $ZrO_2$. In some embodiments, the nanoparticles comprise metal oxide. In other embodiments, the nanoparticle comprises a metal (e.g., a transition metal or metalloid, an elemental metal or an alloy, or the like). In some embodiments, the nanoparticles comprise protein. In some embodiments, the protein is selected from the group consisting of soy protein and whey protein.

In some embodiments, the nanoparticles are incorporated into an organic solvent soluble polymer (e.g. a polyacrylonitrile polymer). In some embodiments, the nanoparticles are incorporated into water soluble polymer (e.g. a polyvinyl alcohol polymer). In some embodiments, the mass of the nanoparticles is at most 50% of the mass of the nanofiber (or of a fluid stock in a method described herein).

In some embodiments, the nanofiber has a net charge. In some embodiments, the nanofiber is substantially neutral (i.e. does not have a net charge). In some embodiments, the nanofiber has a diameter of at most 1,000 nm. In some embodiments, the nanofiber has an aspect ratio of at least 100.

In some embodiments, the invention includes the nanofiber described herein comprising a coating, wherein the coating comprises charged nanoparticles. In some embodiments, the nanofiber comprises a plurality of hydrophobic regions. In some embodiments, the nanofiber comprises protein, nanoclays, biochar, or any combination thereof.

In one aspect, described herein are filters comprising the nanofibers described herein. In one aspect, described herein are filters suitable for selectively retaining charged particulates, large particulates and hydrophobic particulates. In one aspect, described herein are filters suitable for retaining at least 95% of fluid bound particulates challenged against the filter, wherein the pressure drop across the filter medium is at most 4 PSI at an air velocity of 80 cm/s. In some embodiments, the particulates have a diameter between about 1 and 30 nm. In some embodiments, the density of the nanofibers comprising the filter is at most 0.5 $g/ft^2$. In some embodiments, described herein are filters comprising the nanofibers described herein. In some embodiments, the nanofibers are disposed on a substrate. In some embodiments, the filter is configured to filter air in a heating ventilation and air conditioning (HVAC) system. In some embodiments, the nanofibers are non-woven. In some embodiments, the filter is suitable for capturing viruses, microbial organisms (e.g. bacteria), chemicals (e.g. pesticides), or any combination thereof.

In one aspect, described herein is a device comprising the nanofibers described herein, wherein the device is a filter, a membrane, or a sensor.

In one aspect, described herein are methods for making a charged nanofiber, the method comprising electrospinning a nanofiber fluid stock comprising charged nanoparticles or chargeable nanoparticles. In one aspect, described herein are methods for making a charged nanofiber, the method comprising depositing charged nanoparticles or chargeable nanoparticles onto a nanofiber.

In some embodiments, the nanofiber comprises protein, nanoclays, biochar, or any combination thereof. In some embodiments, the nanoparticles comprise metal oxide. In some embodiments, the metal oxide is selected from the group consisting of MgO, $TiO_2$, CuO, ZnO and $ZrO_2$. In some embodiments, the nanoparticles comprise protein. In some embodiments, the protein is selected from the group consisting of soy protein and whey protein.

In some embodiments, the nanoparticles are incorporated into an organic solvent soluble polymer (e.g. a polyacrylonitrile polymer). In some embodiments, the nanoparticles are incorporated into water soluble polymer (e.g. a polyvinyl alcohol polymer). In some embodiments, the mass of the nanoparticles is at most 50% of the mass of the nanofiber.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
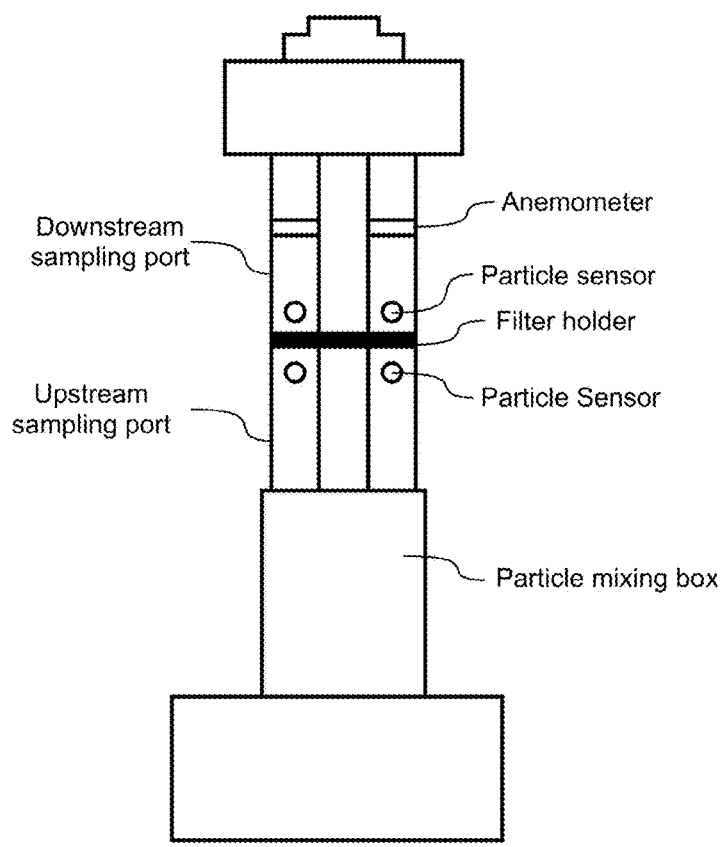
FIG. 1 shows a multi-channel filtration efficiency tester using potassium chloride particles.

Described herein are nanofibers and methods for making nanofibers comprising any one or more of (a) a non-homogeneous charge density; (b) a plurality of regions (e.g., non-aggregated regions / domains) of high charge density; and/or (c) charged nanoparticles or chargeable nanoparticles. In specific embodiments, provided herein are nanofibers and methods of making nanofibers, the nanofibers comprising a plurality of nanoparticles (e.g., non-aggregated nanoparticles), the nanoparticles being charged. In some embodiments, provided herein are nanofibers and methods for making nanofibers comprising a plurality of nanoparticles (e.g., metal containing nanoparticles, such as metal, metal oxide, or ceramic nanoparticles).

In one aspect, the nanofibers provided herein fulfill a need for filtration media that are capable of both high performance (e.g., removal of particle sizes between 0.1 and 0.5 μm) with a low pressure drop, however the invention is not limited in this regard. High efficient particulate air (HEPA) filters have a high filtration efficiency (99.97%) for particles greater than or equal to 0.3 μm in diameter. HEPA performance can be achieved with nylon 6 nanofibrous filter media (made of 80-200 nm diameter fiber) having a coverage density of 1.0 g/ft², however the air flow rate is significantly decreased and there is a considerable increase of pressure drop causing the short operating life of the filter media. In some embodiments, the nanofibers and methods for making nanofibers described herein achieve HEPA performance (or better) with a low pressure drop. In other aspects, nanofibers provided herein provide nanostructured materials meeting a range of needs, particularly wherein non-aggregated domains (e.g., nanoparticles) or non-aggregated charged domains (e.g., nanoparticles) are useful.

Electrospinning

In certain embodiments, provided herein are processes for preparing nanofibers described herein. In some embodiments, the process comprises electrospinning a fluid stock. In specific embodiments, the fluid stock comprises a polymer. In various embodiments, the fluid stock comprises a melted polymer. In other embodiments, the fluid stock comprises a polymer in a solvent. In specific embodiments, the solvent is an organic solvent (e.g., a polar solvent, such as dimethylformamide (DMF)). In some specific embodiments, the solvent is aqueous or water. In specific embodiments, the solvent is water and the polymer is water soluble (e.g., dissolving in water or at least swelling in the water). In more specific embodiments, the solvent is water, the polymer is water soluble, and the nanoparticles are metal nanoparticles. In other specific embodiments, the solvent is water, the polymer is water soluble, and the nanoparticles are metal oxide nanoparticles.

In some embodiments, the nanofibers are produced by electrospinning Electrospinning involves applying an electrical potential between a metal plate and a needle, through which a fluid stock (e.g., comprising a polymer solution) is fed. The potential difference draws the fluid stock into a jet in the direction of the plate. The jet then undergoes a whipping motion due to electrostatic repulsion between its own surfaces, drawing it out to submicron scale diameters. As the fluid stock jet travels toward the plate, the solvent evaporates, producing a mat of non-woven polymer nanofibers. In some embodiments, these nanofibrous mats are characterized by a large surface area-to-volume ratio, small pore size, and high porosity compared to non-woven fabrics. As such, in some embodiments they are used for filtration of particulate matter from air, and when spun onto a substrate made of relatively thick fibers, they increase filtration dramatically (e.g., in capturing and holding particles of submicron size) as described herein.

Figure 14:
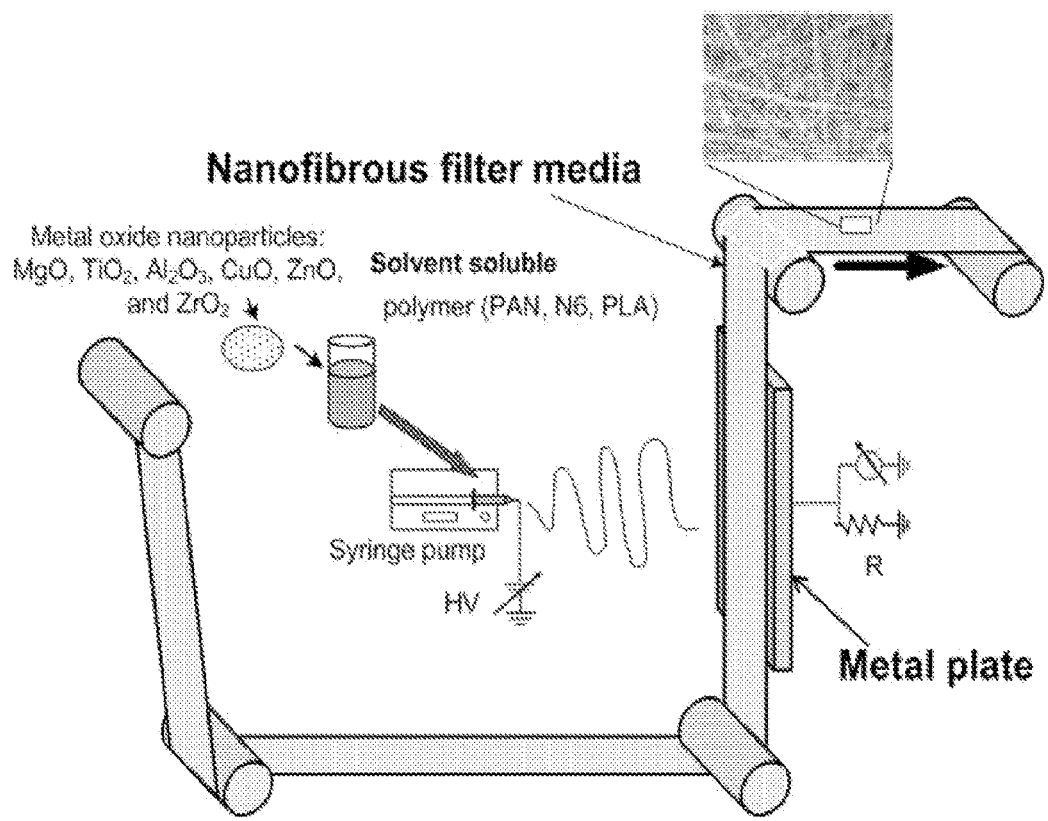
FIG. 14 shows a method for producing nanofibers comprising nanoparticles (e.g., depositing metal oxide nanoparticles directly on a filtration media).
Figure 19:
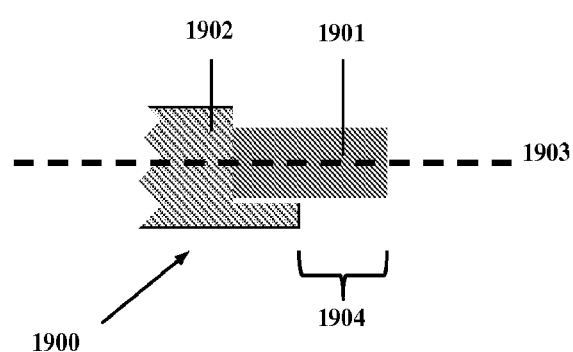
FIG. 19 illustrates an exemplary co-axial electrospinning apparatus for gas assisted electrospinning described herein.

The nanofibers and methods for making nanofibers described herein comprise charged (or chargeable) nanoparticles in some embodiments. In some embodiments, the nanofibers and/or charged nanoparticles are deposited directly onto a supporting filter medium (e.g., FIG. 14). FIG. 14 illustrates spun nanofiber (e.g., directly deposited on a filter support). In some instances, the spun nanofiber comprises a polymer matrix, and nanoparticle (e.g., charged nanoparticle) embedded in the polymer matrix. FIG. 14 illustrates an exemplary system or schematic of a process described herein, particularly a system or process for preparing a nanofiber (e.g., by a coaxial gas assisted electrospinning process). In some instances, a fluid stock (e.g., comprising polymer—such as solvent soluble polymer (PAN, N6, PLA, or the like) and nanoparticles—such as metal oxide nanoparticles (MgO, $TiO_2$, $Al_2O_3$, CuO, ZnO, $ZrO_2$, or the like other metal component described herein)) is prepared by combining nanoparticles with polymer and optional solvent (e.g., for dissolving the polymer). In some embodiments, the fluid stock is provided to an electrospinning apparatus having a needle apparatus (e.g., a coaxial needle apparatus as illustrated in FIG. 19). In certain instances, the electrospinning is gas assisted (e.g., the fluid is provided through the central needle 1903 and the gas is provided through the outer needle 1902—additional needles aligned along a common axis are optional for providing additional fluid stocks, gas, or other fluids—such as for nanofiber coats). The fluid stocks may be provided to an electrospinning apparatus (e.g., an electrospinning needle apparatus with voltage supplied thereto—e.g., voltage sufficient to overcome the surface tension of a liquid polymer or polymer solution to produce a jet) by any device, e.g., by a syringe or a pump. A gas may be provided to an electrospinning needle apparatus from any source (e.g., air pump).

In one aspect, described herein is a method for making a charged nanofiber, the method comprising electrospinning a nanoparticle fluid stock comprising charged nanoparticles or chargeable nanoparticles. In another aspect, described herein is a method for making a charged nanofiber, the method comprising depositing charged nanoparticles or chargeable nanoparticles onto a nanofiber. In specific embodiments, the method comprises electrospinning a fluid stock, the fluid stock comprising a polymer and a plurality of nanoparticles (e.g., chargeable nanoparticles). In specific instances, electrospinning of the nanofibers (i.e., applying an electric charge to the fluid stock to form a jet) causes the nanoparticles to become charged, resulting in an electrospun nanofiber comprising charged nanoparticles embedded in a polymer matrix. In certain instances, gas assisted electrospinning of the nanofiber is utilized, providing an electrospun nanofiber comprising non-aggregated charged nanofibers embedded in a polymer matrix.

Any suitable method for electrospinning is used. For example, elevated temperature electrospinning is described in U.S. Pat. No. 7,326,043 filed on Oct. 18, 2004; U.S. patent application Ser. No. 13/036,441 filed on Feb. 28, 2011; and U.S. Pat. No. 7,901,610 filed on Jan. 10, 2008, which are incorporated herein for such disclosure. In some embodiments, the electro-spinning is gas-assisted as described in PCT Patent Application PCT/US11/24894 filed on Feb. 15, 2011, which is incorporated herein by reference for such disclosure. Briefly, gas-assisted electrospinning comprises expelling a stream of gas at high velocity along with the fluid stock (e.g., as a stream inside the fluid stock or surrounding the fluid stock), which increases the through-put of an electrospinning process. In some instances, gas assisted electrospinning accelerates and elongates the jet of fluid stock emanating from the electrospinner. In some instances, gas assisted electrospinning disperses nanoparticles in nanocomposite nanofibers. For example, in some instances, gas assisted electrospinning (e.g., coaxial electrospinning of a gas—along a substantially common axis—with a fluid stock comprising nanoparticles) facilitates dispersion or non-aggregation of the nanoparticles in the electrospun jet and the resulting as-spun nanofiber (and subsequent nanofibers produced therefrom). In some embodiments, incorporating a gas stream inside a fluid stock produces hollow nanofibers. In some embodiments, the fluid stock is electrospun using any suitable technique.

In certain instances, gas assistance of the electrospinning of a nanoparticle containing fluid stock increases fluid throughput and reduces or prevents nanoparticle aggregation in the needle apparatus, thereby reducing or preventing nanoparticle aggregation in the as-spun fiber. In specific embodiments, the nanofibers comprises less than 50% of nanoparticles that are aggregated. In specific embodiments, the nanofibers comprises less than 40% of nanoparticles that are aggregated. In specific embodiments, the nanofibers comprises less than 25% of nanoparticles that are aggregated. In specific embodiments, the nanofibers comprises less than 10% of nanoparticles that are aggregated. In specific embodiments, the nanofibers comprises less than 5% of nanoparticles that are aggregated.

Figure 17:
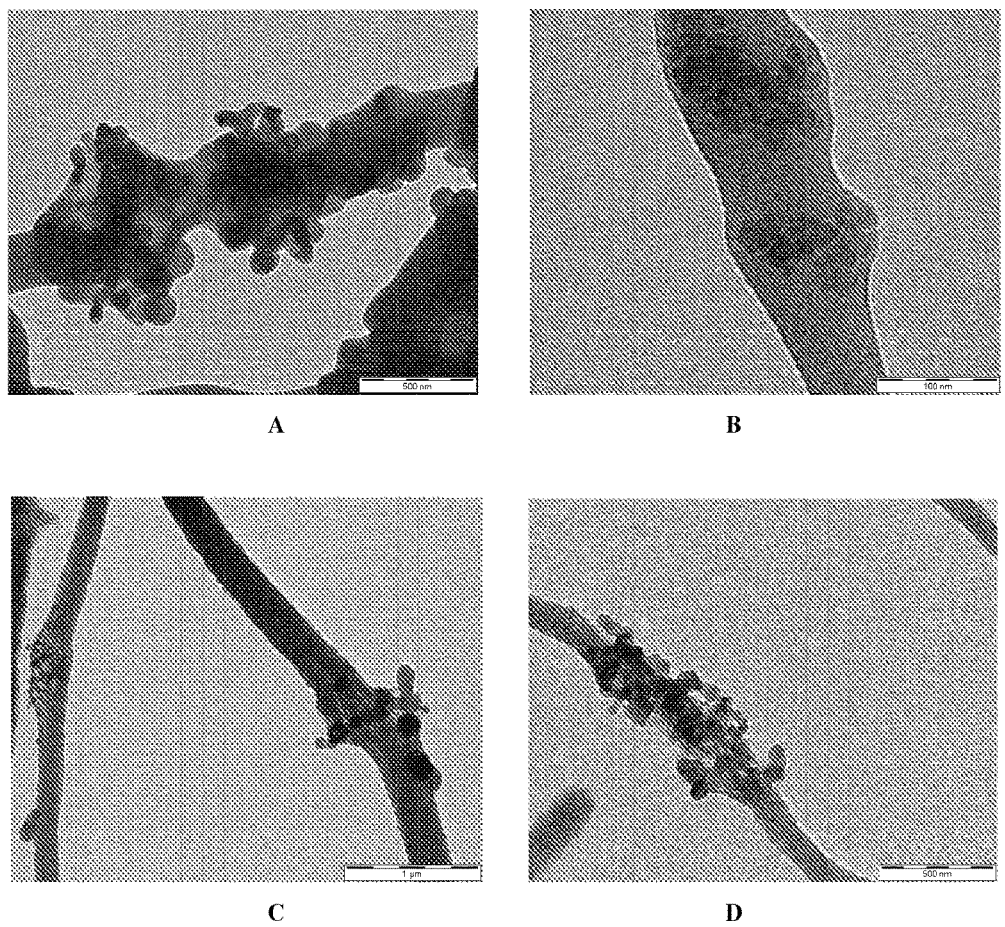
FIGS. 17(A-D) illustrate TEM images of certain nanofibers prepared by electrospinning a fluid stock comprising polymer and nanoparticles without a gas-assisted process described herein, and aggregation of nanoparticles in resultant fibers.
Figure 18:
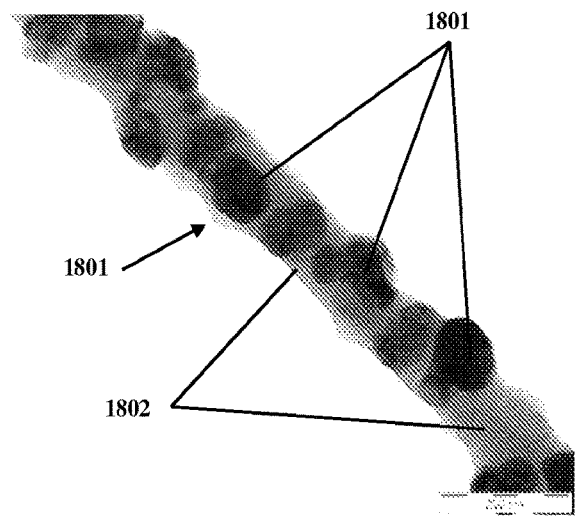
FIG. 18 illustrates a TEM image of nanofibers prepared using gas assisted electrospinning, and the non-aggregation of nanoparticles within a nanofiber matrix resulting therefrom.

FIG. 17 illustrates certain nanofibers prepared by electrospinning a fluid stock comprising polymer and nanoparticles without a gas-assisted process described herein. FIG. 18 illustrate a nanofiber 1801 having non-aggregation of nanoparticles 1801 within the matrix/backbone material 1802, whereas FIG. 17 (panels A, B, C, and D) illustrates aggregation of nanoparticles within the matrix material.

FIG. 19 illustrates co-axial electrospinning apparatus 1900. The coaxial needle apparatus comprises an inner needle 1901 and an outer needle 1902, both of which needles are coaxially aligned around a similar axis 1903 (e.g., aligned with 5 degrees, 3 degrees, 1 degree, or the like). In some embodiments, further coaxial needles may be optionally placed around, inside, or between the needles 1901 and 1902, which are aligned around the axis 1903. In some instances, the termination of the needles is optionally offset 1904.

In some embodiments, the method comprises co-axially electrospinning a first fluid stock with a second fluid stock to produce a nanofiber wherein at least one of the fluid stocks comprises charged or chargeable nanoparticles. Co-axial electrospinning is described in PCT Patent Application PCT/US11/24894 filed on Feb. 15, 2011, which is incorporated herein by reference for such disclosure. In some embodiments, the first fluid stock comprises nanoparticles, and the first fluid stock at least partially coats the second fluid stock.

Fluid Stocks

In some aspects the nanofibers and methods described herein comprise electrospinning a fluid stock. In some embodiments, the fluid stocks are solvent-based (e.g., comprise an organic solvent such as DMF) or aqueous (i.e., water-based). In some embodiments, fluid stocks suitable for producing metal, ceramic, metal alloy, or any combination thereof (i.e., hybrid nanofibers) comprise a water soluble polymer and precursor molecules distributed substantially uniformly on the polymer as described in U.S. Provisional Patent Application No. 61/528,895 filed on Aug. 30, 2011, International Patent Application PCT/US12/53097, filed on Aug. 30, 2012, and U.S. Provisional Patent Application No. 61/701,903, each of which are incorporated herein for such disclosure. The precursors are metal precursor, ceramic precursor, carbon precursor, nanoparticles, or any combination thereof in various embodiments. As used herein, a "carbon precursor" is a polymer (e.g., polyacrylonitrile), wherein thermal treatment of the electrospun fluid stock is capable of converting the carbon precursor into a carbon nanofiber. Other suitable fluid stocks include nanoclays as described in U.S. Pat. No. 7,083,854 filed on May 10, 2005 or inorganic fluid stocks as described in U.S. patent application Ser. No. 11/694,435 filed on Mar. 30, 2007 or fluid stocks comprising protein as described in PCT Patent Application No. PCT/US10/35220 filed on May 18, 2010.

In some embodiments, the metal precursor comprises metal selected from the group consisting of: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Suitable alkali metals include: lithium (Li), sodium (Na), potassium (K), rubidium (Rb), cesium (Cs) and francium (Fr). Suitable alkaline earth metals include: beryllium (Be), magnesium (Mg), calcium (Ca), strontium (Sr), barium (Ba), and radium (Ra). Suitable post-transition metals include: aluminum (Al), gallium (Ga), indium (In), tin (Sn), thallium (Tl), lead (Pb), and bismuth (Bi). Suitable lanthanides include the elements with atomic number 57 to 71 on the periodic table. Suitable actinides include the elements with atomic number 89 to 103 on the periodic table. In some embodiments, suitable metals also include metalloids, such as germanium (Ge), antimony (Sb), polonium (Po), or silicon (Si). The nanoparticle may additionally be germanium (Ge), antimony (Sb) and polonium (Po), silicon (Si), or carbon (C). In further or alternative embodiments, the metal precursor comprises a transition metal, or metalloid. In further or alternative embodiments, the metal precursor is a metal-ligand complex comprising one or more ligand selected from the group consisting of: a carboxylate, a nitrate, a halide, a diketone, an alkoxide, and combinations thereof. In further or alternative embodiments, the reagent precursor, the precursor of the fluid stock, or both comprise one or more metal acetate, metal nitrate, metal chloride, metal methoxide, or a combination thereof. In certain embodiments, a metal precursor loaded in the fluid stock and thermally treated after preparation is suitable for preparing a nanofiber with a continuous metal matrix (e.g., if thermally treated—e.g., 400 to 1200 C—under inert or reducing conditions), a nanofiber with a continuous metal oxide matrix, (e.g., if thermally treated under oxidizing—e.g., air—conditions), a nanofiber with a metal carbide matrix (e.g., if thermally treated at high temperatures—e.g., at least 1200 C), or the like.

Nanofibers

Described herein are nanofibers and methods for making nanofibers comprising any one or more of (a) a non-homogeneous charge density; (b) a plurality of regions of high charge density; and/or (c) charged nanoparticles or chargeable nanoparticles.

In various embodiments, the nanofibers described herein comprise any suitable material. In various embodiments, the methods described herein can be used to make nanofibers comprising any suitable material. Exemplary materials include protein, polymer, nanoclays, biochar or any combination thereof. Methods for producing metal, ceramic, metal alloy and hybrid nanofibers including methods for calcinating nanofibers are described in U.S. Provisional Patent Application 61/528,895 filed on Aug. 30, 2011. In addition, virtually any material is allowed for producing charged nanofibers using the methods of the disclosure. In some embodiments, the material is convertible from suitable precursors in the fluid stock. In some embodiments, the nanofiber is a calcium phosphate (Ca—P) nanofiber. In some embodiments, the methods of the present disclosure may produce charged Ca—P nanofibers.

In some embodiments, the methods of the present disclosure are combined with other methods to produce yet more embodiments of the present disclosure. For example, the nanofiber is surface-modified. For example, enzymes are immobilized on the nanofiber surface to create a biological catalyst. In another example, doping processes from the semiconductor industry are employed to intentionally introduce impurities into an extremely pure semiconductor nanofiber for the purpose of modulating its electrical properties.

The nanofiber has any suitable diameter. In some embodiments, the diameter is about 20 nm, about 50 nm, about 100 nm, about 200 nm, about 300 nm, about 500 nm, or about 1,000 nm. In some embodiments, the diameter is at most 20 nm, at most 50 nm, at most 100 nm, at most 200 nm, at most 300 nm, at most 500 nm, at most 1,000 nm, at most 1.5 microns, at most 2 microns, or the like. The nanofiber has any suitable aspect ratio (ratio of length to diameter). In some embodiments, the aspect ratio is at least 20, at least 50, at least 100, at least 300, at least 500, at least 1000, at least 10,000, or the like. In some embodiments, nanofibers provided herein have a (e.g., average) length of at least 10 µm, at least 20 µm, at least 100 µm, at least 500 µm, at least 1,000 µm, at least 5,000 µm, at least 10,000 µm, or the like.

In some embodiments, the nanofiber is coated. In some embodiments, the coating comprises charged nanoparticles. The nanofiber is hydrophilic in some embodiments. In some embodiments, the nanofiber is hydrophobic. In some embodiments, the nanofiber comprises a plurality of hydrophobic regions.

Nanofiber Charge Characteristics

In some embodiments, the nanofibers described herein have a net charge (i.e., a non-zero charge). The net charge is positive in some embodiments. The net charge is negative in some embodiments. The magnitude of the charge (positive or negative) can be any suitable value. In some embodiments, the nanofiber is substantially neutral (i.e. does not have a net charge).

In some embodiments, the nanofibers have a non-homogeneous charge density. Non-homogenous charge density is possible even when the nanofibers are (overall) neutrally charged (i.e., the nanofibers have regions of positive charge and negative charge). Nanofibers with a non-homogenous charge density and methods for producing nanofibers with a non-homogenous charge density are useful in filtration applications for example. In some instances, e.g., in filtration, negatively charged particles (e.g., contaminants or pollutants) are attracted to regions of highly positive charge density, allowing high filtration efficiencies with less nanofiber material and a low pressure drop as exemplified and described herein.

In one aspect, the nanofibers described herein have a charge density with a high standard deviation. The standard deviation is calculated from a plurality of substantially uniformly distributed regions of the nanofiber. The regions are surface regions, measured in terms of area in some embodiments. In other embodiments, the regions are volumetric regions. The regions are substantially evenly distributed if the distances from one region to its closest neighboring region vary by at most 10%, at most 20%, at most 50% in various embodiments. The standard deviation is high in some embodiments, indicating a highly non-homogenous charge distribution. In some embodiments, the standard deviation of the charge density of the nanofiber is about 50%, about 100%, about 200%, about 300%, about 400%, about 500%, about 700%, about 1,000%, and the like of the net charge density of the nanofiber. In some embodiments, the standard deviation of the charge density of the nanofiber is at least 50%, at least 100%, at least 200%, at least 300%, at least 400%, at least 500%, at least 700%, at least 1,000%, and the like of the net charge density of the nanofiber.

In some embodiments, nanofibers provided herein comprise domains of high charge density (e.g., charged nanoparticles) embedded within a continuous matrix (e.g., a polymer matrix, a carbonized polymer matrix, a metal (e.g., prepared from calcined metal precursor), a ceramic (e.g., prepared from calcined and oxidized metal precursor), or the like). In specific embodiments, the domains of high charge density are non-aggregated. In specific embodiments, the nanofibers comprises less than 50% of highly charged domains (e.g., charged nanoparticles) that are aggregated. In specific embodiments, the nanofibers comprises less than 40% of highly charged domains that are aggregated. In specific embodiments, the nanofibers comprises less than 25% of highly charged domains that are aggregated. In specific embodiments, the nanofibers comprises less than 10% of highly charged domains that are aggregated. In specific embodiments, the nanofibers comprises less than 5% of highly charged domains that are aggregated.

In some embodiments, highly charged domains provided herein have a charge at least 2 times, at least 3 times, at least 5 times, at least 10 times, at least 20 times, or more of the charge of the low-charged (e.g., non- or lower-charged) matrix. In certain embodiments, highly charged domains provided herein have a charge at least 2 times, at least 3 times, at least 5 times, at least 10 times, at least 20 times, or more of the charge of the overall average charge (e.g., per unit size of the average highly charged domain) of the nanofiber.

In some embodiments, a nanocomposite nanofiber provide herein comprises discrete domains within the nanocomposite nanofiber. In specific embodiments, the discrete domains comprise a metal, metal oxide, or ceramic material (e.g., a charged or chargeable material). In certain embodiments, the discrete domains are non-aggregated. In some embodiments, the non-aggregated domains are dispersed, e.g., in a substantially uniform manner, along the length of the nanofiber. In certain embodiments, the nanocomposite nanofibers provided herein do not comprise a concentration of domains in one segment (e.g., a 500 nm, 1 micron, 1.5 micron, 2 micron) segment that is over 10 times (e.g., 20 times, 30 times, 50 times, or the like) as concentrated as an immediately adjacent segment. In some embodiments, the segment size for such measurements is a defined length (e.g., 500 nm, 1 micron, 1.5 micron, 2 micron). In other embodiments, the segment size is a function of the average domain (e.g., particle) size (e.g., the segment 5 times, 10 times, 20 times, 100 times the average domain size). In some embodiments, the domains have a (average) size 1 nm to 1000 nm, 1 nm to 500 nm, 1 nm to 200 nm, 1 nm to 100 nm, 20 nm to 30 nm, 1 nm to 20 nm, 30 nm to 90 nm, 40 nm to 70 nm, 15 nm to 40 nm, or the like.

In some embodiments, the nanofibers comprise non-aggregated discrete domains. In certain embodiments, the nanofibers do not comprise a concentration of domains 20 times higher along a 500 nm long segment along the length of the nanofiber than an adjacent 500 nm length of the nanofiber. In some embodiments, the discrete domains comprise at least 90% by weight metal having an oxidation state of zero. In specific embodiments, the discrete domains comprise at least 95% by weight metal having an oxidation state of zero. In other embodiments, the discrete domains comprise at least 90% by weight metal having an oxidation state of greater than zero (e.g., a metal oxide). In specific embodiments, the discrete domains comprise at least 95% by weight metal having an oxidation state of greater than zero (e.g., a metal oxide).

Thermally stimulated current (TSC) is one suitable method for measuring the electrical properties of the nanofiber (e.g., residual current and thus charge density). Two exemplary TSC methods are described in Example 6. In some embodiments, the nanofibers comprise charged or chargeable nanoparticles. In some embodiments, the average thermally stimulated current (TSC) of the nanofiber is about 150%, about 200%, about 300%, about 400%, about 500%, about 1,000%, and the like of the TSC of the nanofiber without charged nanoparticles or chargeable nanoparticles. In some embodiments, the nanofibers comprise charged or chargeable nanoparticles. In some embodiments, the average thermally stimulated current (TSC) of the nanofiber is at least 150%, at least 200%, at least 300%, at least 400%, at least 500%, at least 1,000%, and the like of the TSC of the nanofiber without charged nanoparticles or chargeable nanoparticles.

In some embodiments, TSC is measured on a collection of the nanofibers described herein. In some embodiments, the collection of nanofibers has a thickness of 20 microns and a porosity of 0.5. The TSC has any suitable value. In some embodiments, the TSC of a disk (one inch of diameter and 20 µm in thickness) of a collection of nanofibers has a TSC of about $5\times10^{-11}$, about $1\times10^{-12}$, about $5\times10^{-12}$, about $1\times10^{-13}$, about $5\times10^{-13}$, and the like Amps per bulk surface area ($5\times10^{-4}$ m$^2$). In some embodiments, the TSC of a one inch disk region of a collection of nanofibers has a TSC of at least $5\times10^{-11}$, at least $1\times10^{-12}$, at least $5\times10^{-12}$, at least $1\times10^{-13}$, at least $5\times10^{-13}$, and the like Amps per bulk surface area ($5\times10^{-4}$ m$^2$). In some embodiments, the TSC of a one inch disk region of a collection of nanofibers has a TSC of between about $1\times10^{-12}$ and $1\times10^{-13}$ Amps per bulk surface area ($5\times10$ m$^2$).

Discrete Domains and Regions of High Charge Density

In one aspect, described herein are charged nanofibers and methods for making charged nanofibers having a plurality of regions of high charge density. The regions of high charge density are comprised of any suitable material and are made or formed in any suitable manner. In some embodiments, each of the plurality of regions of high charge density comprises a nanoparticle. In other embodiments, the regions are formed by a chemical etching process, by laser modification of the surface of the nanofiber, or any other suitable method. In some embodiments, the regions of high charge density are volumetric regions (and the charge density has units of charge per volume). In some embodiments, the regions of high charge density are surface regions (and the charge density has units of charge per area).

In some embodiments, the nanofibers comprises regions of high charge density and the regions of high charge density have any suitable charge density. In some embodiments, the charge density of the region of high charge density is about 200%, about 300%, about 500%, about 1,000%, about 5,000%, about 10,000%, and the like of the net charge density of the nanofiber. In some embodiments, the charge density of the region of high charge density is at least 200%, at least 300%, at least 500%, at least 1,000%, at least 5,000%, at least 10,000%, and the like of the net charge density of the nanofiber.

In various embodiments, nanofibers described herein have a continuous material and discrete domains ("regions") of a second material. In some embodiments, the second material constitutes or comprises a region of high charge density. In various embodiments, these regions or domains (e.g., the regions of high charge density) have any suitable diameter. The regions (e.g., of charge density) have any suitable shape. In some embodiments, the diameter is measured by microscopy. In some embodiments, an average diameter is calculated from a plurality of regions (e.g., of high charge density). In some embodiments, the regions (e.g., of high charge density) have an average diameter of about 3 nm, about 5 nm, about 10 nm, about 20 nm, about 50 nm, about 100 nm, about 200 nm, about 400 nm, about 1,000 nm, and the like. In some embodiments, the regions (e.g., of high charge density) have an average diameter of at least 3 nm, at least 5 nm, at least 10 nm, at least 20 nm, at least 50 nm, at least 100 nm, at least 200 nm, at least 400 nm, at least 1,000 nm, and the like. In some embodiments, the regions (e.g., of high charge density) have an average diameter of at most 3 nm, at most 5 nm, at most 10 nm, at most 20 nm, at most 50 nm, at most 100 nm, at most 200 nm, at most 400 nm, at most 1,000 nm, and the like.

In certain embodiments, the regions (e.g., of high charge density) are separated from each other by any suitable distance. The separation distance may be determined in any suitable manner, such as by microscopy. In some embodiments, the distances from each region (e.g., of high charge density) to its nearest (e.g., high charge) region are averaged. In some embodiments, the regions (e.g., of high charge density) are separated by about 0.05 µm, about 0.1 µm, about 0.5 µm, about 1 µm, about 5 µm, about 10 µm, about 50 µm, about 100 µm, and the like on average. In some embodiments, the regions (e.g., of high charge density) are separated by at least 0.05 µm, at least 0.1 µm, at least 0.5 µm, at least 1 µm, at least 5 µm, at least 10 µm, at least 50 µm, at least 100 µm, and the like on average.

In some embodiments, efficient filtration is achieved using a relatively small or few regions of high charge density. The regions of high charge density comprise any suitable percentage of the volume of the nanofiber. In some embodiments, the total volume of the regions of high charge density comprise about 0.1%, about 0.5%, about 1%, about 5%, about 10%, about 25%, about 50%, and the like of the volume of the nanofiber. In some embodiments, the total volume of the regions of high charge density comprise at least 0.1%, at least 0.5%, at least 1%, at least 5%, at least 10%, at least 25%, at least 50%, and the like of the volume of the nanofiber. In some embodiments, the total volume of the regions of high charge density comprise at most 0.1%, at most 0.5%, at most 1%, at most 5%, at most 10%, at most 25%, at most 50%, and the like of the volume of the nanofiber.

In some embodiments, efficient filtration is achieved using a relatively small or few regions of high charge density. The regions of high charge density comprise any suitable percentage of the surface area of the nanofiber. In some embodiments, the total surface area of the regions of high charge density comprise about 0.1%, about 0.5%, about 1%, about 5%, about 10%, about 25%, about 50%, and the like of the surface area of the nanofiber. In some embodiments, the total surface area of the regions of high charge density comprise at least 0.1%, at least 0.5%, at least 1%, at least 5%, at least 10%, at least 25%, at least 50%, and the like of the surface area of the nanofiber. In some embodiments, the total surface area of the regions of high charge density comprise at most 0.1%, at most 0.5%, at most 1%, at most 5%, at most 10%, at most 25%, at most 50%, and the like of the surface area of the nanofiber.

In some instances, the regions (e.g., of high charge density) are distributed substantially uniformly on the nanofiber. Here, in some embodiments, the regions (e.g., of high charge density) are substantially uniformly distributed if the standard deviation of the distances between a plurality of regions (e.g., of high charge density) from its nearest region of high charge density is about 20%, about 50%, about 100%, and the like of the average of the distances between regions (e.g., of high charge density). In some embodiments, the regions (e.g., of high charge density) are substantially uniformly distributed if the standard deviation of the distances between a plurality of regions (e.g., of high charge density) from its nearest region (e.g., of high charge density) is at most 20%, at most 50%, at most 100%, and the like of the average of the distances between regions (e.g., of high charge density).

Nanoparticles

In one aspect, described herein are charged nanofibers and methods for making charged nanofibers comprising charged nanoparticles or chargeable nanoparticles. For example, $TiO_2$ nanoparticles have been widely used in various applications such as photocatalysts, pigments and cosmetics additives, often in media of intermediate polarity. However, the effect of incorporated nanoparticles (such as $TiO_2$) in nanofibers (e.g., covering a filter substrate on air filtration efficiency) has been described previously. As described herein, high air filtration efficiency with a low pressure drop is achieved by covering the substrate with polymeric nanofibers containing metal oxide nanoparticles. In some instances, charged nanoparticles electrostatically interact with dust particles (e.g., increasing affinity between the nanofiber and the pollutant/dust particle, and in some instances—modulating where on the nanofiber the affinity occurs).

In one embodiment, filtration efficiency of filter media covered with pure PAN nanofibers and PAN/$TiO_2$ hybrid nanofibers was evaluated, taking into account properties affecting filtration efficiency, including the structural properties of filter media (pore diameter, pore size distributions, pressure drop) and the electric charge property of the as-spun fibers. As shown herein, despite less fiber coverage density on the cellulose substrate, the filtration efficiency of the PAN filter media with $TiO_2$ nanoparticles added is much greater than that of those made with pure PAN fibers even under less pressure drop. Without being held to any particular theory, such enhancement is explained by the added electric charge interaction between TiO2 nanoparticles in nanofibrous filter media and the simulated dust particles, supported by the thermally stimulated current (TSC) results.

The nanoparticles are made of any suitable material. In some embodiments, the nanoparticles comprise metal oxide. In some embodiments, the metal oxide is selected from the group consisting of MgO, $TiO_2$, CuO, ZnO and $ZrO_2$. In some embodiments, the nanoparticles comprise protein. In some embodiments, the protein is selected from the group consisting of soy protein and whey protein. In certain embodiments, the nanoparticles comprise a metal. In further or alternative embodiments, the nanoparticles comprise a ceramic.

Provided in various embodiments herein are nanofibers comprising pure metal nanoparticles and nanofibers comprising metal nanoparticles. In various embodiments, the pure metal nanoparticles have any suitable percent composition of metal. In some embodiments, the metal nanoparticles comprise about 99.99%, about 99.95%, about 99.9%, about 99%, about 98%, about 97%, about 96%, about 95%, about 90%, about 80%, and the like of metal by mass. In some embodiments, the metal nanoparticles comprise at least about 99.99%, at least about 99.95%, at least about 99.9%, at least about 99%, at least about 98%, at least about 97%, at least about 96%, at least about 95%, at least about 90%, at least about 80%, and the like of metal by mass.

In various embodiments, the metal of a metal, metal oxide, or ceramic provided herein is any suitable metal: transition metal, alkali metal, alkaline earth metal, post-transition metal, lanthanide, or actinide. Suitable transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Suitable alkali metals include: lithium (Li), sodium (Na), potassium (K), rubidium (Rb), cesium (Cs) and francium (Fr). Suitable alkaline earth metals include: beryllium (Be), magnesium (Mg), calcium (Ca), strontium (Sr), barium (Ba), and radium (Ra). Suitable post-transition metals include: aluminum (Al), gallium (Ga), indium (In), tin (Sn), thallium (Tl), lead (Pb), and bismuth (Bi). Suitable lanthanides include the elements with atomic number 57 to 71 on the periodic table. Suitable actinides include the elements with atomic number 89 to 103 on the periodic table. In some embodiments, suitable metals also include metalloids, such as germanium (Ge), antimony (Sb), polonium (Po), or silicon (Si). The nanoparticle may additionally be germanium (Ge), antimony (Sb) and polonium (Po), silicon (Si), or carbon (C). In some embodiments, the metal is not a metalloid. In specific embodiments, the metal component is not a silicon nanoparticle. In additional or other specific embodiments, the metal component is not a lithium containing nanoparticle.

Provided in various embodiments herein are nanofibers comprising pure ceramic nanoparticles and nanofibers comprising ceramic nanoparticles. In some embodiments, the ceramic nanoparticles comprise about 99.99%, about 99.95%, about 99.9%, about 99%, about 98%, about 97%, about 96%, about 95%, about 90%, about 80%, and the like of ceramic by mass. In some embodiments, the ceramic nanoparticles comprise at least about 99.99%, at least about 99.95%, at least about 99.9%, at least about 99%, at least about 98%, at least about 97%, at least about 96%, at least about 95%, at least about 90%, at least about 80%, and the like of ceramic by mass.

In some embodiments, the ceramic is a metal oxide. Exemplary ceramics include but are not limited to $Al_2O_3$, $ZrO_2$, $Fe_2O_3$, CuO, NiO, ZnO, CdO, $SiO_2$, $TiO_2$, $V_2O_5$, $VO_2$, $Fe_3O_4$, SnO, $SnO_2$, CoO, $CoO_2$, $CO_3O_4$, $HfO_2$, $BaTiO_3$, $SrTiO_3$, and $BaSrTiO_3$.

Provided in various embodiments herein are nanofibers comprising pure metal alloy nanoparticles and nanofibers comprising metal alloy nanoparticles. The metal alloy is allowed to be any metal alloy including: transition metal, alkali metal, alkaline earth metal, post-transition metal, lanthanide, or actinide, additionally, germanium (Ge), antimony (Sb) and polonium (Po), and silicon (Si). Exemplary metal alloys include, but are not limited to CdSe, CdTe, PbSe, PbTe, FeNi (perm alloy), Fe—Pt intermetallic compound, Pt—Pb, Pt—Pd, Pt—Bi, Pd—Cu, and Pd—Hf.

In some embodiments, the nanoparticles are incorporated into the fluid stock from which the nanofiber is electrospun. In some embodiments, the nanoparticles are incorporated into an organic solvent soluble polymer (e.g. a polyacrylonitrile polymer). In some embodiments, the nanoparticles are incorporated into water soluble polymer (e.g. a polyvinyl alcohol polymer).

The nanoparticles comprise any suitable fraction of the fluid stock or the nanofibers. In some embodiments the mass of the nanoparticles is about 0.1%, about 1%, about 5%, about 10%, about 25%, about 50%, and the like of the mass of the nanofiber. In some embodiments the mass of the nanoparticles is at most 0.1%, at most 1%, at most 5%, at most 10%, at most 25%, at most 50%, and the like of the mass of the nanofiber.

Nanofiber Production

The fluid stock has any suitable composition.

In some embodiments, a polymer in a process or nanofiber described herein is an organic polymer. In some embodiments, polymers used in the compositions and processes described herein are hydrophilic polymers, including water-soluble and water swellable polymers. In some embodiments, the polymer (e.g., water soluble polymer) used in a fluid stock (e.g., aqueous) or fiber described herein by way of non-limiting example polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, polyvinylidene difluoride ("PVDF"), polyacrylate (e.g., polyalkacrylate, polyacrylic acid, polyalkylalkacrylate, or the like), and the like. In some embodiments, the polymer is isolated from biological material. In some embodiments, the polymer is starch, chitosan, xanthan, agar, guar gum, and the like. In other instances, e.g., wherein other polymers, such as polyacrylonitrile ("PAN") are optionally utilized (e.g., using DMF as a solvent).

In some instances, the nanoparticle to polymer weight ratio is at least 1:5, at least 1:4, at least 1:3, at least 1:2, at least 1:1, at least 2:1, or the like. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In some embodiments, the fluid stock comprises at least about 0.5 weight %, at least about 1 weight %, at least about 2 weight %, at least about 5 weight %, at least about 10 weight %, or at least about 20 weight polymer.

Some embodiments suitable for producing pure PAN and PAN/TiO2 hybrid solutions are shown in Table 1. As shown here, different volume percents of $TiO_2$ nanoparticles (e.g., $PAN/TiO_2$=97:3, 92.5:7.5, 87:13 v/v %) are dispersed in 2 mL of DMF with a vortex. In some embodiments, PAN polymers are dissolved in DMF at 100° C. for 4 hours and each $TiO_2$/DMF solution is then added to the PAN/DMF solution to give overall 10 wt % PAN in DMF. In some embodiments, the solutions are then electrospun onto a metal plate covered with aluminum foil. In some embodiments, pure PAN solution and $PAN/TiO_2$ (7.5 v %) solutions are electrospun onto 3"×3" commercial cellulose filters (bare filter) in various fiber masses for the nanofibrous filter media. In some instances, bare filters are coated with nanofibers from the pure PAN solution and other bare filters with nanofibers from the $PAN/TiO_2$ hybrid solution, in fiber masses of 0.1, 0.25 and 0.5 g/ft² for example. In some embodiments, electrospinning is performed using an 18 gauge needle with a flow rate of 0.025 mL/min. The potential difference applied between the needle and collector plate is 15 kV, and the distance between the plate and the tip of the needle is 13 cm in some instances.

TABLE 1

Exemplary fluid stock recipes for the electrospun nanofibers.

| Sample name | Volume ratio (%) | |
| --- | --- | --- |
| (volume % of $TiO_2$) | PAN | $TiO_2$ |
| Pure PAN | 100 | — |
| $PAN/TiO_2$ (3.0 v %) | 97.0 | 3.0 |
| $PAN/TiO_2$ (7.5 v %) | 92.5 | 7.5 |
| $PAN/TiO_2$ (13 v %) | 87.0 | 13.0 |

Nanofiber Characteristics

Figure 2:
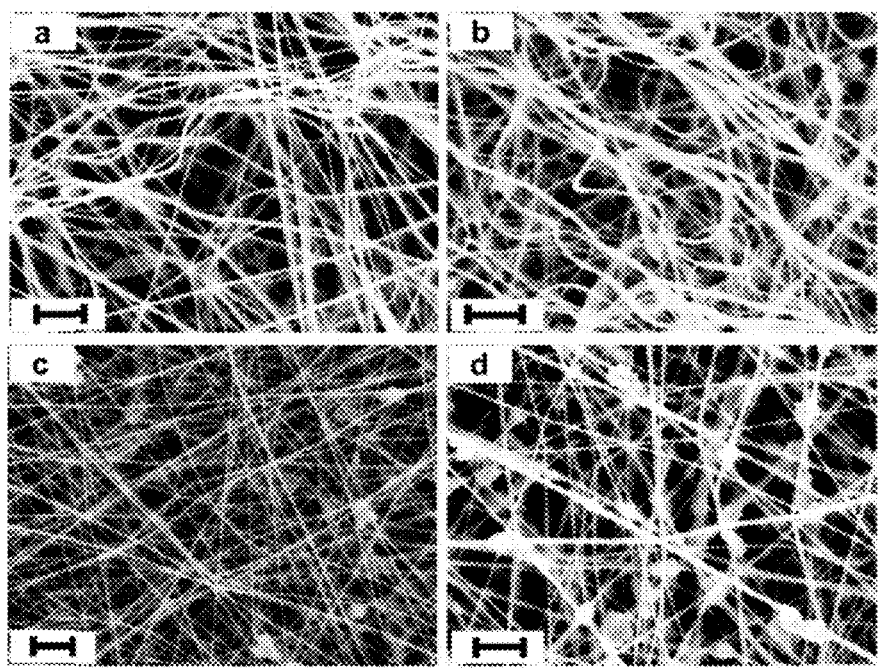
FIG. 2 shows SEM images of as-spun fibers: (a) pure PAN fibers, (b) PAN/$TiO_2$ (3.0 vol %) hybrid fibers, (c) PAN/$TiO_2$ (7.5 vol %) hybrid fibers, and (d) PAN/$TiO_2$ (13 vol %) hybrid fibers.
Figure 3:
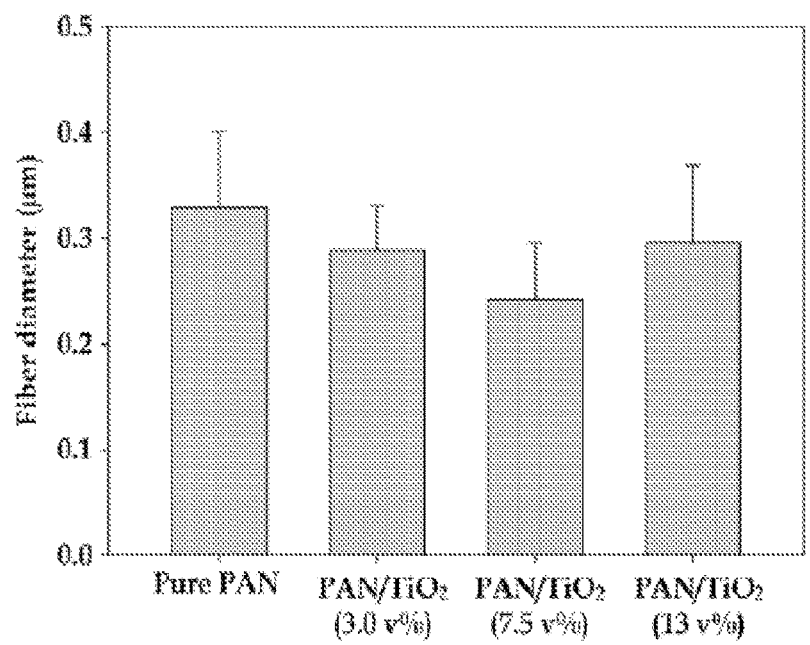
FIG. 3 shows diameters of the as-spun fibers (the error bar represents the standard deviation of the fiber diameter, n=30).

As described herein, the nanofibers comprise charged and/or chargeable nanoparticles in some instances. For example, as shown by the SEM images in FIG. 2, $PAN/TiO_2$ (13 vol %) fibers (FIG. 2d) have a plurality of aggregates on the surface and $PAN/TiO_2$ (7.5 vol %) fibers (FIG. 2c) have some beads. Two other exemplary fibers (FIGS. 2a, b) have no beads on their fiber surface. In the embodiment depicted herein, the average diameters of all the as-spun fibers range from 0.2 μm to 0.4 μm. In some embodiments, the diameter of the electrospun fibers is slightly reduced with the increase of $TiO_2$ nanoparticles in the fibers, as shown in FIG. 3. Without limitation, it is thought that the diameter of the fibers with high contents of $TiO_2$ (13 vol %) embodied herein is thicker than some embodiments with lower contents of particles because of impaired spinnability due to some aggregates of the particles. In some embodiments, the concentration of nanoparticles is suitably low such that the fluid stock has desirable properties for electrospinning.

Figure 4:
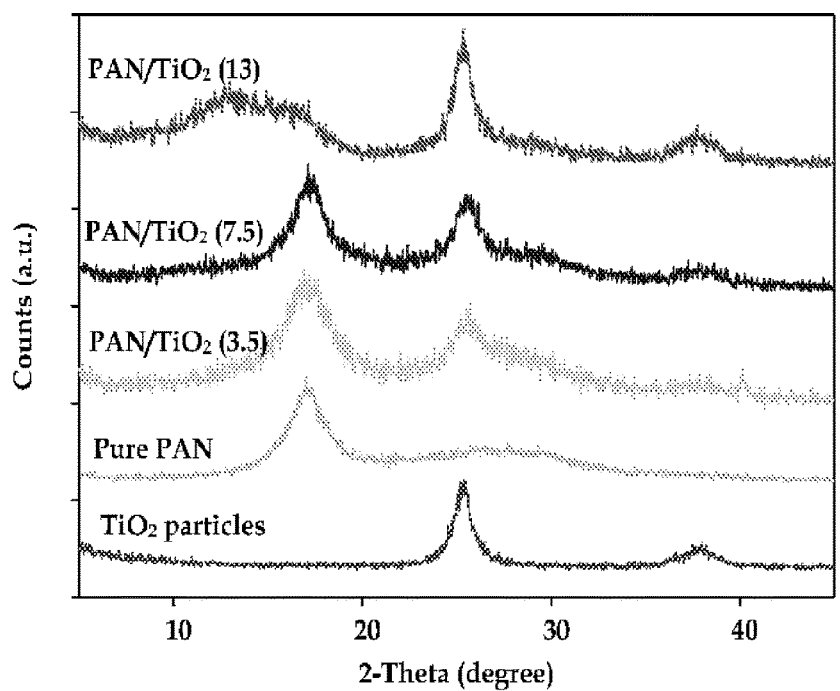
FIG. 4 shows XRD patterns of TiO2 particles and pure PAN fiber and PAN/TiO2 hybrid fibers with different volume fraction of TiO2 particles.

In some embodiments, the presence and uniform distribution of nanoparticles (e.g., $TiO_2$) in the fibers is significant for filter performance of nanofibrous filter media as a functional medium. In some embodiments, the incorporation of $TiO_2$ particles in the as-spun fibers and their influence on PAN crystallization is measured by XRD. In some instances, XRD measures the crystalline patterns of both of $TiO_2$ particles and the all as-spun fibers. As can be seen in the embodiment depicted in FIG. 4, the XRD spectra show that the particles revealed two peaks at 25.2° and 37.8°, and the pure PAN exhibited a dominant crystal peak at around 17°. With increasing $TiO_2$ content in the fibers, the peaks at 25.2° and 37.8° became gradually sharper and the peak at 17° disappeared completely with the $PAN/TiO_2$ (13 vol %) hybrid fibers, showing that the particles were embedded in the PAN fibers. In this embodiment, high contents of $TiO_2$ particles (13 v %) in the fibers disrupted PAN crystals. In some embodiments, the concentration of nanoparticles is such that polymer crystals are not disrupted.

Figure 5:
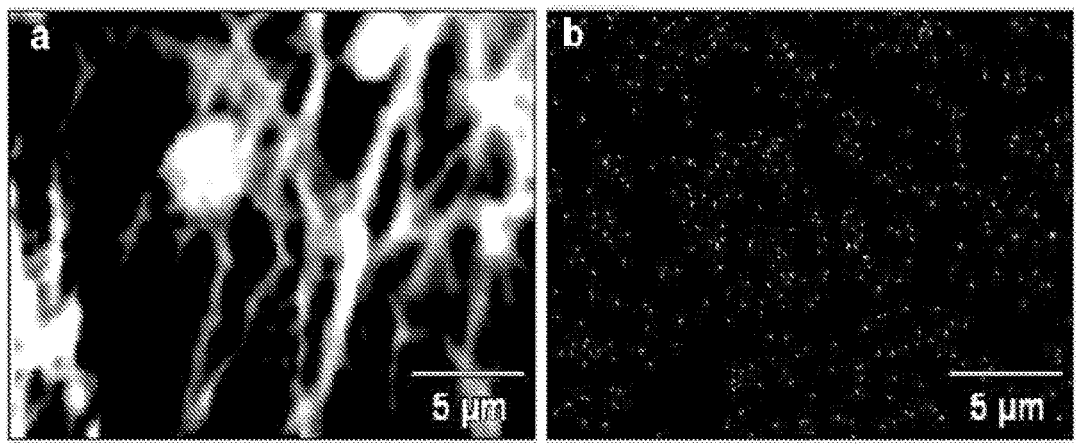
FIG. 5 shows images of as-spun PAN/TiO2 (7.5) fibers (a) and a mapping image (b) of Ti information at the same area of the spun fibers using EMPA.

The nanofibers described herein are incorporated into filter media in some instances. In the following example, pure PAN fibers and $PAN/TiO_2$ (7.5 vol %) hybrid fibers are used to fabricate nanofibrous filter media. Here, the presence of $TiO_2$ particles in the $PAN/TiO_2$ (7.5 vol %) hybrid fibers is evaluated using the EMPA technique as shown in FIG. 5. Here, the image of FIG. 5a was captured by EMPA to match the same spot with the color coded image. The image of FIG. 5b shows the color coded image from EMPA, which indicates the presence of Ti throughout the fibers. FIG. 5 confirms that the $TiO_2$ particles are well distributed in the electrospun fibers in this instance.

Figure 6:
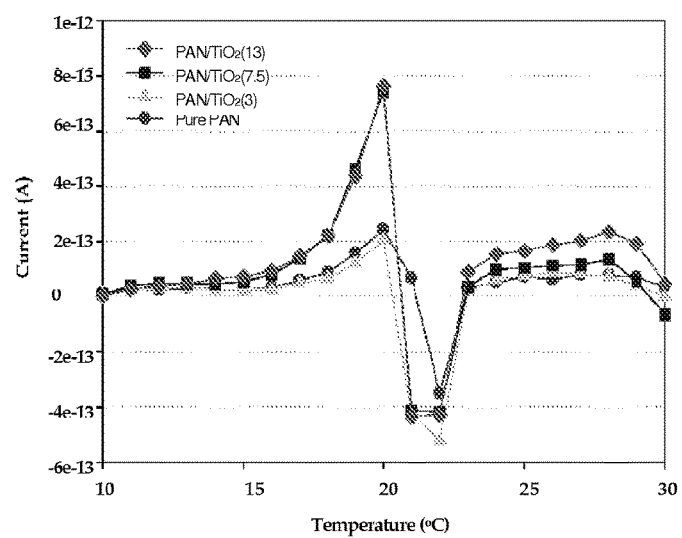
FIG. 6 shows thermally simulated current (TSC) spectra of as-spun nanofibers near room temperature.
Figure 7:
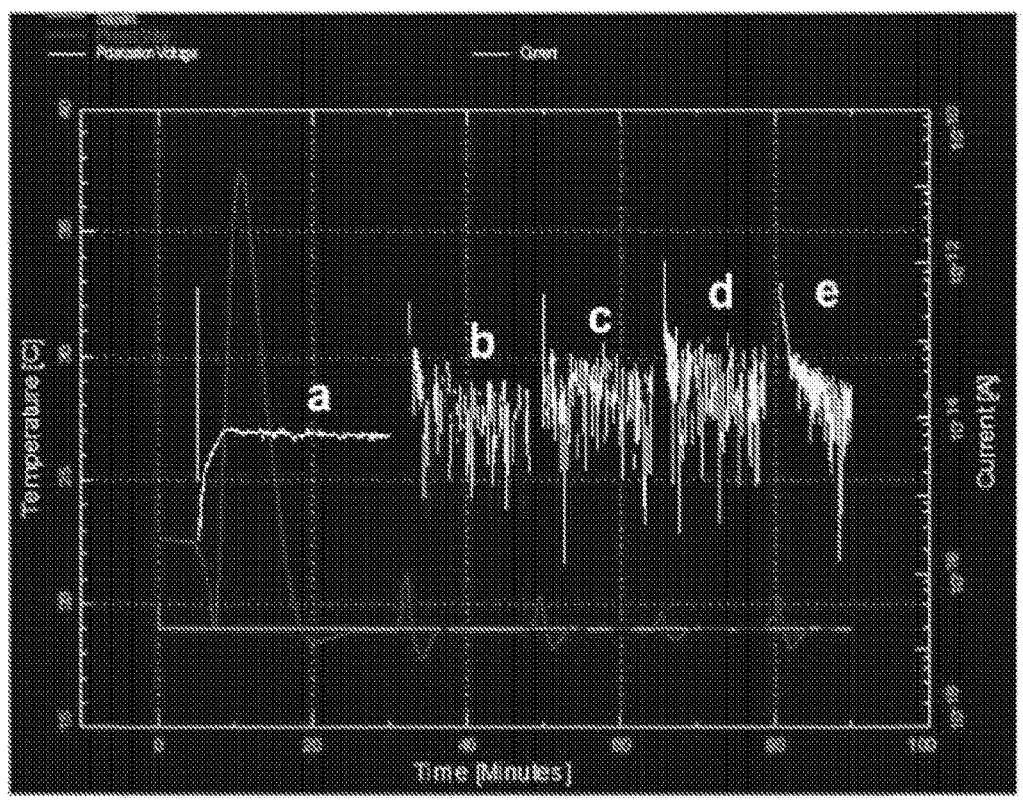
FIG. 7 shows time dependencies of TSC results of as-spun nanofibers at 19° C.: (a) no sample, (b) pure PAN fibers, (c) PAN/TiO2 fibers (3.0 vol %), (d) PAN/TiO2 fibers (7.5 vol %), (e) PAN/TiO2 fibers (13 vol %) (red line — temperature profile, yellow (positive current) and blue line (negative current) — monitored current signals).

In one aspect, the nanofibers described herein are charged and/or comprise a plurality of regions of high charge density. In FIG. 6, the TSC spectra of exemplary as-spun fibers show the currents generated while the fibers are being heated at a ramping temperature of 7° C./min, which is observed at room temperature. Here, to characterize the current trends according to the contents of $TiO_2$ particles in the PAN fibers and the $PAN/TiO_2$ hybrid fibers, four electrospun fiber samples were prepared as listed in Table 1. The fibers with high contents of $TiO_2$ particles (7.5 and 13 vol %) show an increase in positive charge at the temperature 20° C. and then a drop to negative charge at 22° C. In this embodiment, pure PAN fibers and $PAN/TiO_2$ (3.5 vol %) hybrid fibers show small changes in charge in the temperature range of 18 to 23° C. In this embodiment, the fibers with high contents of $TiO_2$ particles (7.5 and 13 vol %) show slightly higher current around 25° C. FIG. 7 shows exemplary time-dependent TSC spectra of the current changes with the prepared samples and the blank (no sample), which were monitored at 19° C. for 10 min. With the increase of $TiO_2$ particle contents in the hybrid fibers, the measured currents became higher in this embodiment. Without limitation it is believed that the observed currents are the result of the release of charges that were displaced within the samples. By heating a material, a displacement current is observed when a temperature is reached at which the charges are mobile. In some embodiments, the content of $TiO_2$ particles in the hybrid fibers influences the charge of the fibers and/or the filtration efficiency of the nanofibrous filter media.

The concentration of nanoparticles in the nanofibers is adjusted in any suitable manner. In one example, the nanofibrous filter media are prepared with the PAN/$TiO_2$ (7.5 vol %) hybrid fibers. In some embodiments, 13 vol % $TiO_2$ in the hybrid fibers induces the deformation of fiber crystal structures, leading eventually to the change of physical properties of PAN fibers, and a plurality of aggregates on the surface of fibers.

Figure 15:
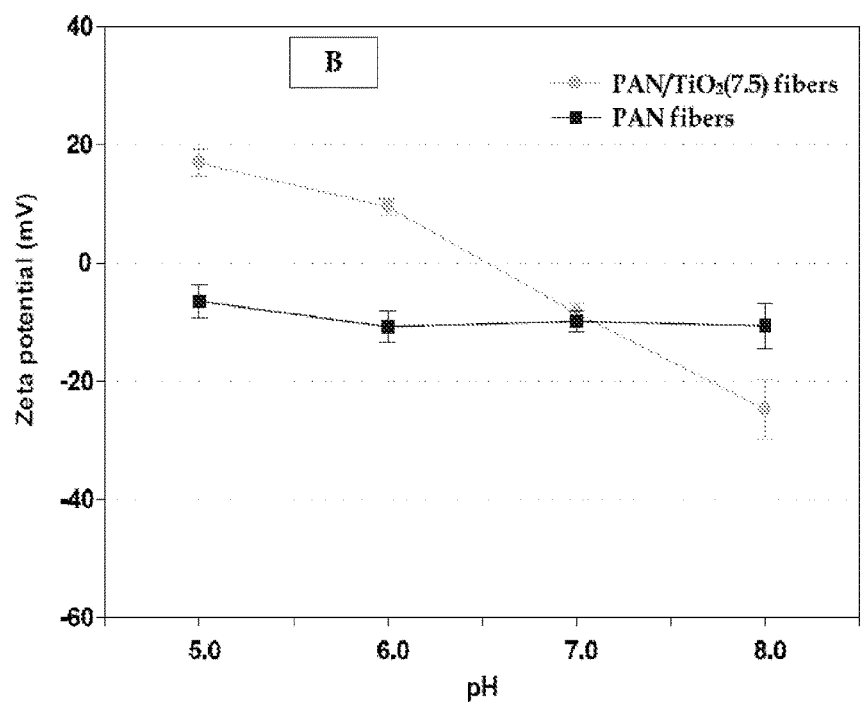
FIG. 15 shows a plot of zeta potential in mV versus pH for PAN fibers with and without TiO2nanoparticles.

FIG. 15 illustrates a plot of zeta potential in mV versus pH for PAN fibers with and without $TiO_2$ nanoparticles. In some embodiments, a filter comprising nanofibers described herein has a zeta potential of at least 0 mV at a pH of less than 7. In some specific embodiments, a filter comprising nanofibers described herein has a zeta potential of at least 0 mV (e.g., at least 10 mV) at a pH of 6. In certain specific embodiments, a filter comprising nanofibers described herein has a zeta potential of at least 0 mV (e.g., at least 10 mV) at a pH of 5.

Filter Cartridges and Other Applications

The charged nanofibers (and/or compositions including nanofibers) described herein are incorporated or capable of being incorporated into any suitable device, product, process, and the like. For example, the present invention encompasses a battery, capacitor, electrode, solar cell, catalyst, adsorber, filter, membrane, sensor, fabric, and/or tissue regeneration matrix comprising the nanofibers described herein. Also included are methods for making a battery, capacitor, electrode, solar cell, catalyst, adsorber, filter, membrane, sensor, fabric, and/or tissue regeneration matrix comprising the ordered porous nanofibers described herein. For example, the charged nanofibers described herein can be incorporated into the filter cartridges as described in U.S. Provisional Patent Application 61/538,458 filed on Sep. 23, 2011, which is incorporated by reference herein for such disclosure.

Any filter comprising the nanofibers described herein is encompassed by the present invention. In some embodiments, the filters described herein remove particles based on at least two modes. Exemplary filtration modes comprise filtration by selective retention of charged particles, selective retention of large particles, and selective retention of hydrophobic particles. In some embodiments, described herein are filters suitable for selectively retaining charged particulates, large particulates and hydrophobic particulates.

In one aspect, the filters described herein achieve efficient filtration at a low pressure drop. In one embodiment, described herein is a filter comprising nanofibers, wherein the filter is suitable for retaining at least 95% of fluid bound particulates (e.g., particle size between 0.1 and 0.5 µm or between about 1 and 30 nm) challenged against the filter, wherein the pressure drop across the filter medium is at most 4 PSI at an air velocity of 80 cm/s.

In some embodiments, the nanofibers are disposed on a substrate. In some embodiments, the filters are non-woven. The substrate can be any suitable material, and optionally provides support for the nanofibers. Some filtration may take place in the substrate. The filter has any suitable density of nanofibers. In some embodiments, the density of the nanofibers comprising the filter is about 0.1 g/ft$^2$, about 0.25 g/ft$^2$, about 0.5 g/ft$^2$, about 1 g/ft$^2$, about 5 g/ft$^2$, and the like. In some embodiments, the density of the nanofibers comprising the filter is at least 0.1 g/ft$^2$, at least 0.25 g/ft$^2$, at least 0.5 g/ft$^2$, at least 1 g/ft$^2$, at least 5 g/ft$^2$, and the like. In some embodiments, the density of the nanofibers comprising the filter is at most 0.1 g/ft$^2$, at most 0.25 g/ft$^2$, at most 0.5 g/ft$^2$, at most 1 g/ft$^2$, at most 5 g/ft$^2$, and the like.

In some embodiments, the filter is configured to filter air in a heating ventilation and air conditioning (HVAC) system. In some embodiments, the filter is suitable for capturing viruses, microbial organisms (e.g. bacteria), chemicals (e.g. pesticides), or any combination thereof.

Nanofibrous Filter Media Characteristics

Figure 8:
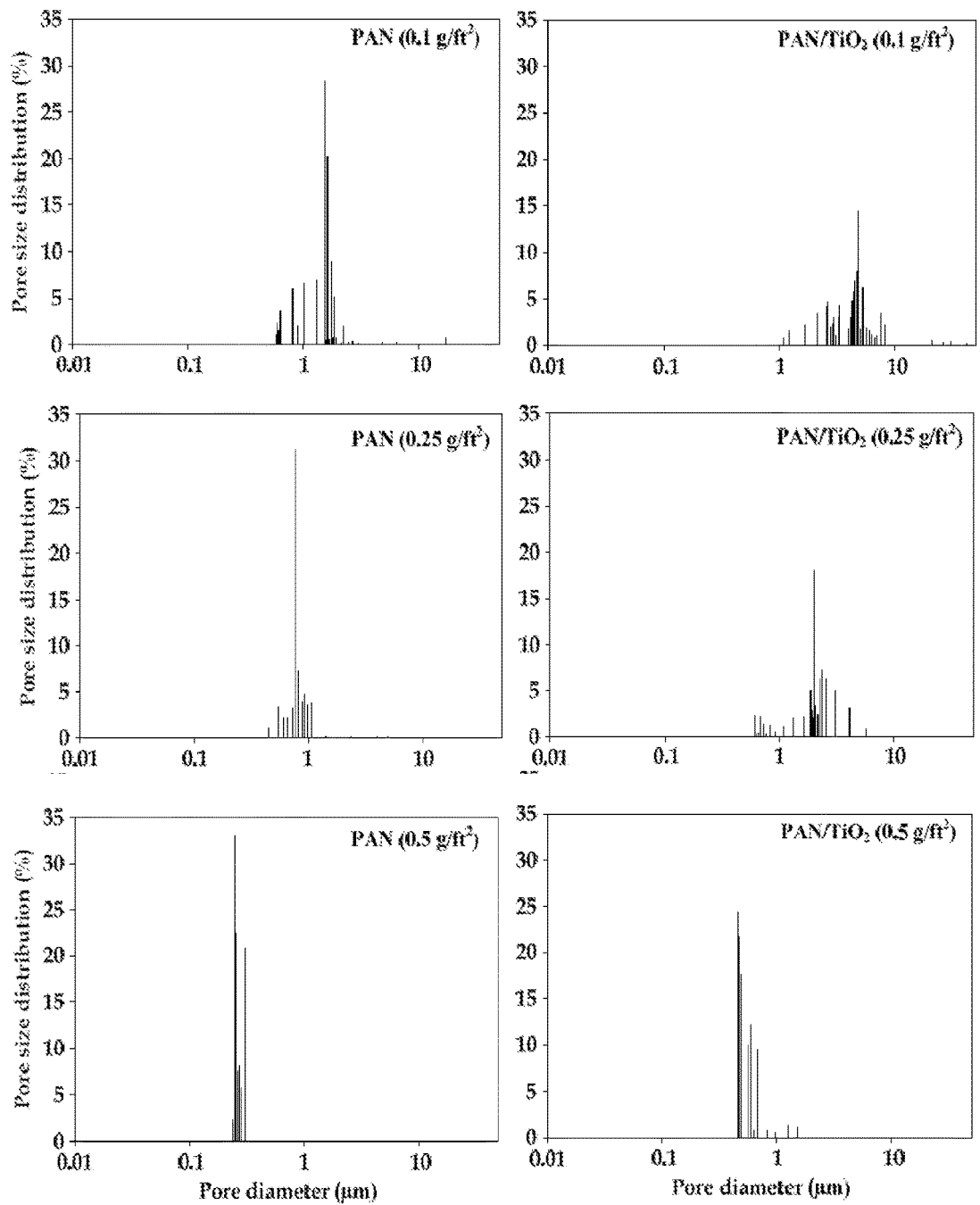
FIG. 8 shows pore size distribution of the cellulose substrates covered with the varied weight spun fibers.

The filter media described herein are porous and/or comprise a plurality of ordered pores in some instances. As shown in FIG. 8, the relationship of pore size distribution versus pore diameter is measured by a Capillary Flow Porometry (CFP) in some instances. In some embodiments, the pore size distribution and the pore diameter depend on the fiber coverage density and fiber size on a bare filter for example. As the mass of the spun fibers on the bare filter increases, the pore size distribution becomes narrower and the pore diameter smaller in some instances. For example, the filter media with the pure PAN fibers (0.1 g/ft$^2$) and the PAN/$TiO_2$ hybrid fibers (0.1 g/ft$^2$) show a pore size distribution and pore sizes ranging from 0.6 to 3 µm and 1.0 to 10 µm, respectively. In this instance, the highest mass of the pure PAN fibers on the bare filter had the narrowest pore size distribution and the smallest pore diameter among the prepared samples, with a pore diameter of 0.4-0.5 µm. Here, though the PAN/$TiO_2$ hybrid fibers were spun on the bare filter with the same weight as the pure PAN fibers, the fiber coverage density of the spun hybrid fibers on the bare filter was lower because the density of $TiO_2$ (4.23 g/cm$^3$) is higher than that of PAN (1.18 g/cm$^3$). In this instance, the PAN/$TiO_2$ (7 vol %) hybrid fibers contain 23 wt % of $TiO_2$ particles in the PAN fibers and weigh approximately 160% of the pure PAN fibers. In some embodiments, the pore size distribution and the pore diameter are highly related to the weight of spun fibers on the bare filter. In some embodiments, these pore parameters influence the filtration efficiency of the nanofibrous filter media.

Figure 9:
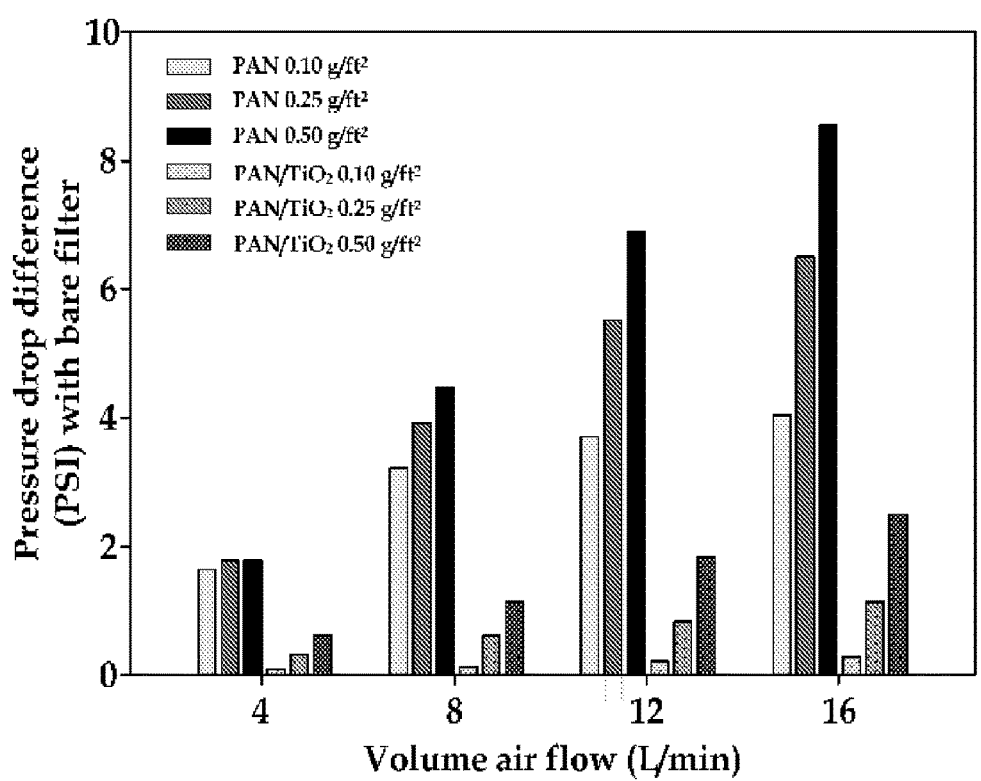
FIG. 9 shows pressure drop difference (PSI) with bare filter at different volume air flow (L/min) measured by a capillary flow porometry.

In one aspect, the filter media described herein have a low pressure drop. In the CFP method, pressure drop and volume air flow through the sample are measured, optionally in both dry and wet conditions. In the depicted embodiment, the pressure drop increases with the increase of air flow for the dry samples, as shown in FIG. 9. In this instance, the bare filter exhibited a pressure drop of 0.43 PSI at the air flow of 20 L/m. The addition of PAN nanofibers on the bare filter increases the pressure drop, and the increase in pressure drop becomes more prominent with increasing coverage of nanofibers. In some instances, the pure PAN nanofibrous filter media show higher pressure drop with the increase of air flow than the counterpart PAN/$TiO_2$ hybrid nanofibrous filter media. Here, even though the same nanofiber masses between the pure PAN and the PAN/$TiO_2$ hybrid were covered on the substrate, the density of the PAN/$TiO_2$ hybrid fibers is much higher than pure PAN fibers. In this example, the fiber coverage density on the substrate is considerably different between the two fiber systems and they induce different pressure drops. At the air velocity of 80 cm/s during the filtration test which corresponds with the air flow of around 16 L/min at CFP (tube diameter of CFP is around 2.1 cm), the pressure drop of the filter media covered with the PAN/TiO$_2$ hybrid nanofibers (0.5 g/ft$^2$) is approximately 4 times less than the counterpart filter media in some embodiments.

Figure 16:
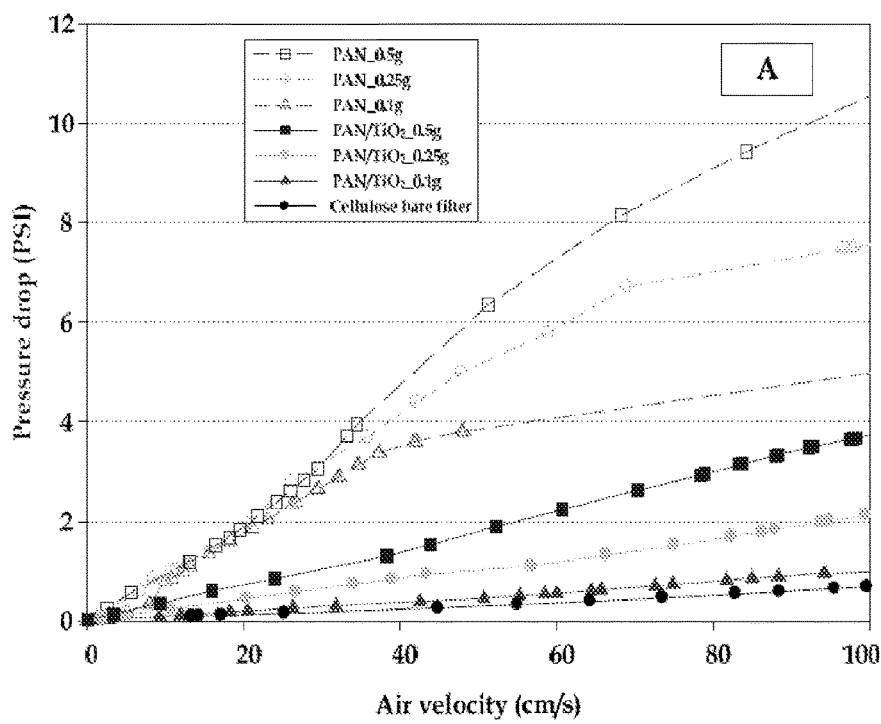
FIG. 16 shows a plot of pressure drop in PSI versus air velocity in cm/s for filtration media comprising PAN at various densities, with and without TiO2 nanoparticles.

In some embodiments, the pressure drop of a filter provided herein having nanofibers deposited on a filter substrate (e.g., base cellulose filter) is less than 1.2 times, less than 1.5 times, less than 2 times, less than 5 times, less than 10 times that of the filter substrate (e.g., base cellulose filter) without the nanofibers, e.g., at an air velocity of 20 cm/s, 40 cm/s, 60 cm/s, 80 cm/s, 100 cm/s. In some embodiments, the pressure drop of a filter provided herein having nanofibers deposited on a filter substrate (e.g., base cellulose filter) is less than 2 PSI, less than 4 PSI, or the like that of the filter substrate (e.g., base cellulose filter) without the nanofibers, e.g., at an air velocity of 20 cm/s, 40 cm/s, 60 cm/s, 80 cm/s, 100 cm/s. For example, FIG. 16 illustrates the improved pressure drop characteristics of nanofibers comprising nanoparticles described herein over nanofibers without the nanoparticles.

Filtration Characteristics

Figure 10:
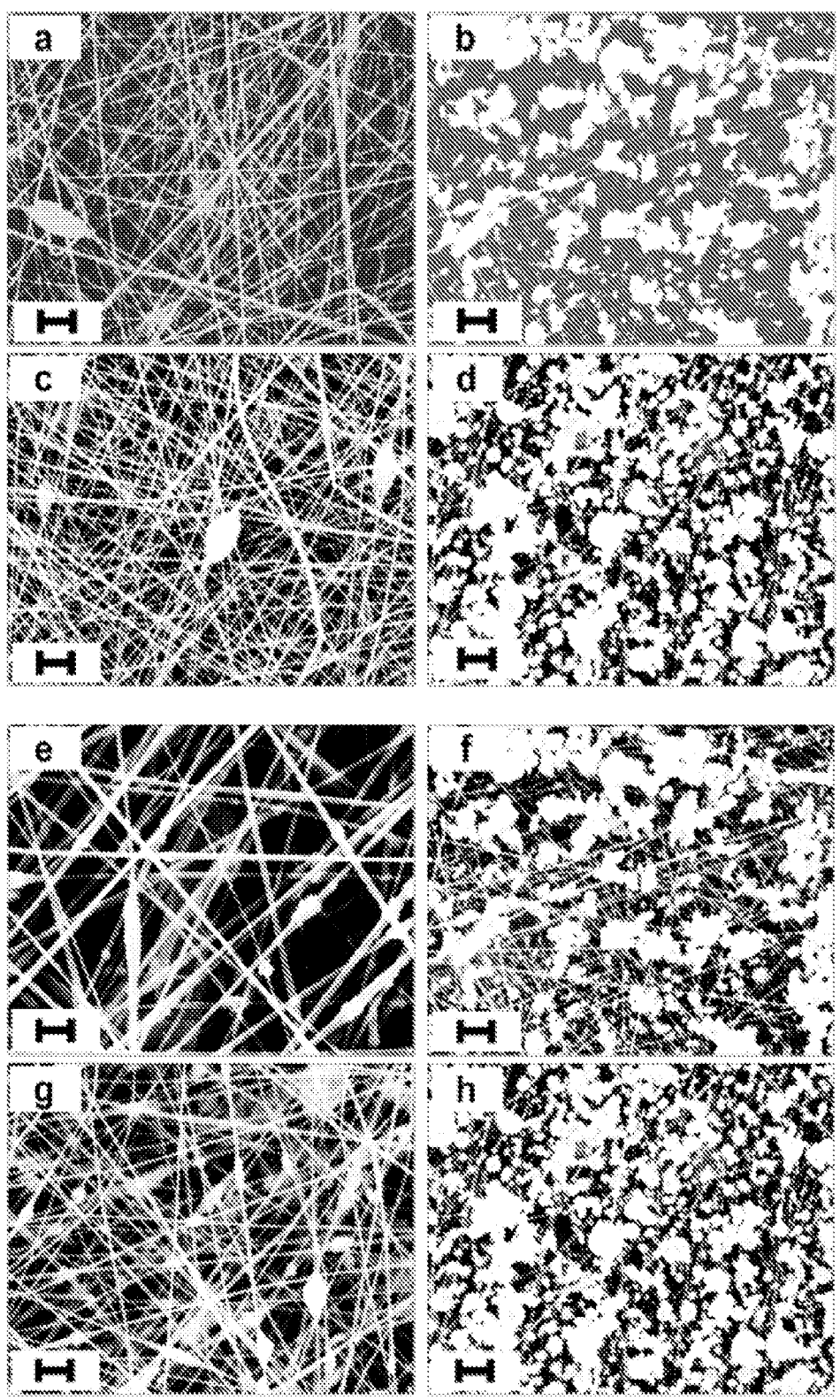
FIG. 10 shows SEM images of PAN nanofibers and PAN/TiO2 hybrid nanofibers on the cellulose substrate before and after filtration testing: (a-b) 0.1 g/ft2 PAN fibers, (c-d) 0.5 g/ft2 PAN fibers, (e-f) 0.1 g/ft2 PAN/TiO2 hybrid fibers, (g-h) 0.5 g/ft2 PAN/TiO2 hybrid fibers (all scale bars are 3 μm).

In one aspect, described herein are filters comprising the nanofibers described herein. In some embodiments, the filter is suitable for selectively retaining charged particles, large particles and hydrophobic particles. In one embodiment, SEM images of the PAN nanofibrous filter media and the PAN/TiO$_2$ hybrid nanofibrous filter media are taken before and after filtration testing as shown in FIG. 10. Images of the PAN nanofibers (0.1 g/ft$^2$ and 0.5 g/ft$^2$) on the bare filter are shown before and after the filtration test in FIG. 10 (a-b) and (c-d), respectively. Images of the PAN/TiO$_2$ hybrid nanofibers (0.1 g/ft$^2$ and 0.5 g/ft$^2$) before and after the filtration test are also taken in FIG. 10 (e-f) and (g-h), respectively. The images taken after the filtration test show the trapped KCl particles on the filters. In this embodiment, a difference of the fiber density between the prepared filter media covered with the pure fiber and the hybrid fiber, 0.1 g/ft$^2$ and 0.5 g/ft$^2$, is observed by comparing images (a) and (e) or (c) and (g). The filter media made with the hybrid fibers have a lower fiber density. Here, the filter media were also observed after the filtration test to evaluate the particle deposition on the filter media. In this instance, the filter media covered with the highest weight (0.5 g/ft$^2$) of spun fibers showed higher density of particle deposition than the ones with low weight (0.1 g/ft$^2$). In this instance, there is not a striking visual difference in the amount of particle deposition on the pure PAN system and the hybrid system filter media. In this embodiment, the electrospun nanofibers covering the bare filter captured a wide range of particle sizes on their surface. Some of the particles stuck to the nanofibers were 100 to 150 nm in size. In some embodiments, the fibers are not broken during the filtration test, even with high air velocity.

Figure 11:
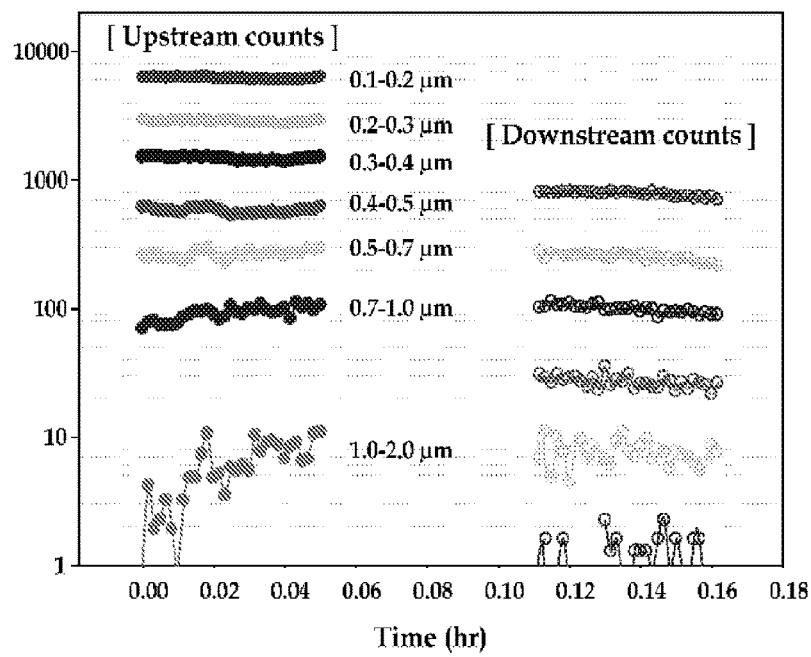
FIG. 11 shows typical results of filtration efficiency tests with PAN/TiO2 (0.25 g/ft2), showing the particle counts for upstream and downstream measurement.

In one embodiment, six nanofibrous filter specimens are fabricated for the filtration test, with the different fiber masses (0.1, 0.25, and 0.5 g/ft$^2$) of the pure PAN fibers and the PAN/TiO$_2$ hybrid fibers. Here, the mass of the spun fibers on the cellulose substrate is directly weighed and related to electrospinning time. Particles with diameters ranging from 0.1 µm to 2.0 µm are generated for the filtration test using potassium chloride (KCl) solution. These generated particles are mixed with air and passed through a filter specimen at a surface velocity of 80 cm/s. In some embodiments, to calculate the filtration efficiency of the filter specimen, the particles with 0.1-2.0 µm in diameter in the air going through the filter specimen (upstream) as well as in the air coming out after filtering (downstream) are counted using a laser particle counter. In FIG. 11, an example of typical particle count data obtained at the upstream and downstream measurement points during a filtration efficiency test is shown. The filtration efficiency (FE) is calculated based on Equation 1:

$$FE = \left(1 - \frac{\text{average downstream particle count}}{\text{average upstream partilce count}}\right) \times 100 \quad \text{(Equation 1)}$$

For all six filter specimens tested in this instance, the filtration efficiency was computed in seven particle size ranges: 0.1-0.2 µm, 0.2-0.3 µm, 0.3-0.4 µm, 0.4-0.5 µm, 0.5-0.7 µm, and 0.7-1.0 µm as well as an average over the range 0.1-1.0 µm. Exemplary filtration efficiencies measured are reported in Table 2. It can be observed that there is a general improvement in filtration efficiency with the increase of the fiber coverage covering the bare filter in the present embodiment. In addition, the PAN/TiO$_2$ hybrid filter specimens showed higher filtration efficiencies than their pure PAN counterparts.

TABLE 2

Filtration efficiencies of the nanofiber filter media according to the particle size.

| Sample name (fiber coverage density (g/ft$^2$)) | Particle size (µm) | | | | | | |
|---|---|---|---|---|---|---|---|
| | 0.1-0.2 | 0.2-0.3 | 0.3-0.4 | 0.4-0.5 | 0.5-0.7 | 0.7-1.0 | Avg 0.1-1.0 |
| PAN (0.1) | 89.9 | 92.6 | 93.4 | 93.6 | 93.4 | 91.2 | 91.1 |
| PAN (0.25) | 87.7 | 91.4 | 93.5 | 95.5 | 97.2 | 98.7 | 89.5 |
| PAN (0.5) | 92.4 | 94.5 | 95.3 | 95.8 | 96.3 | 97.0 | 93.4 |
| PAN/TiO$_2$ (0.1) | 86.7 | 92.4 | 95.1 | 96.7 | 97.6 | 98.3 | 90.0 |
| PAN/TiO$_2$ (0.25) | 95.4 | 96.9 | 97.4 | 98.2 | 98.6 | 99.0 | 96.2 |
| PAN/TiO$_2$ (0.5) | 98.4 | 99.1 | 99.3 | 99.3 | 99.3 | 99.1 | 98.8 |

Figure 12:
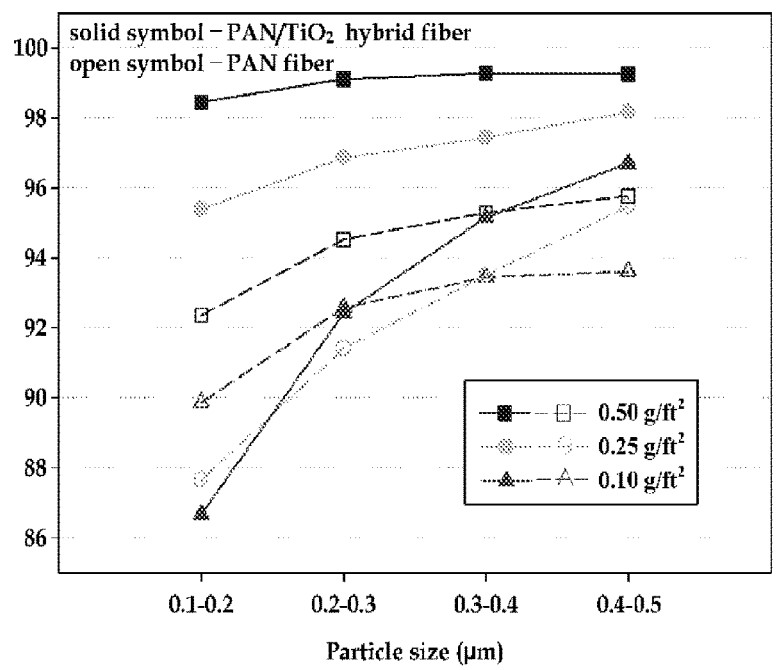
FIG. 12 shows filtration efficiency (%) of the various substrates covered with different fiber mass as a function of particle size.

In FIG. 12, the filtration efficiencies in the particle ranges 0.1-0.5 µm for the pure PAN and PAN/TiO$_2$ hybrid nanofibrous filter specimens are plotted together. Here, with increasing the particle size, the all filter specimens showed increasing filtration efficiency. In this instance, the pure PAN nanofibrous filter media with 0.1 g/ft$^2$ fiber mass showed slightly higher filtration efficiency up to particle sizes of 0.4 µm than the one with 0.25 g/ft$^2$ fiber mass. In some embodiments, this is because the pure PAN nanofibrous filter media with 0.1 and 0.25 g/ft$^2$ fiber masses do not have the capability to filter out the small particle sizes (below 0.4 µm) because of low fiber coverage density on the bare filter. In the case of very small particle sizes, the filtration efficiency of the filter media is influenced by the locally uneven fiber density on the bare filter in some instances. In some embodiments, locally higher or lower fiber coverage density on the bare filter is fabricated due to the short electrospinning time, especially with the 0.1 g/ft$^2$ fiber coverage density. In some instances with small particle size, the filtration efficiency of the PAN/TiO$_2$ (0.1 g/ft$^2$) hybrid nanofibrous filter specimen showed the lowest filtration efficiency, but the PAN/TiO$_2$ (0.25 and 0.5 g/ft$^2$) resulted in higher filtration efficiency than the pure PAN system, even though the hybrid system had a larger pore diameter than the pure system. In particular, the PAN/TiO$_2$ (0.5 g/ft$^2$) nanofibrous filter media show high filtration efficiency (over 98%) even with the smallest particle sizes (0.1-0.2 µm) and over 99% filtration results with larger particle sizes than 0.3 µm in some embodiments. In some embodiments the filters described herein have a long operating life. For example, without limitation, if the PAN/TiO$_2$ nanofibrous filter media have the same fiber mass of 1.0 g/ft² as the nylon 6 nanofibrous filter media, the PAN/TiO₂ nanofibrous filter media have less fiber coverage on the bare filter so that they are expected to have much longer operating time due to the low pressure drop and show superior filtration efficiency based on the filtration results from the PAN/TiO2 (0.5 g/ft²) nanofibrous filter media. In some embodiments, compared to the pure PAN system (0.5 gift²), the PAN/TiO₂ hybrid system results in better filtration efficiency (6%) with the finest particle size (0.1-0.2 μm) even though the hybrid system had larger pores in the filter media.

Figure 13:
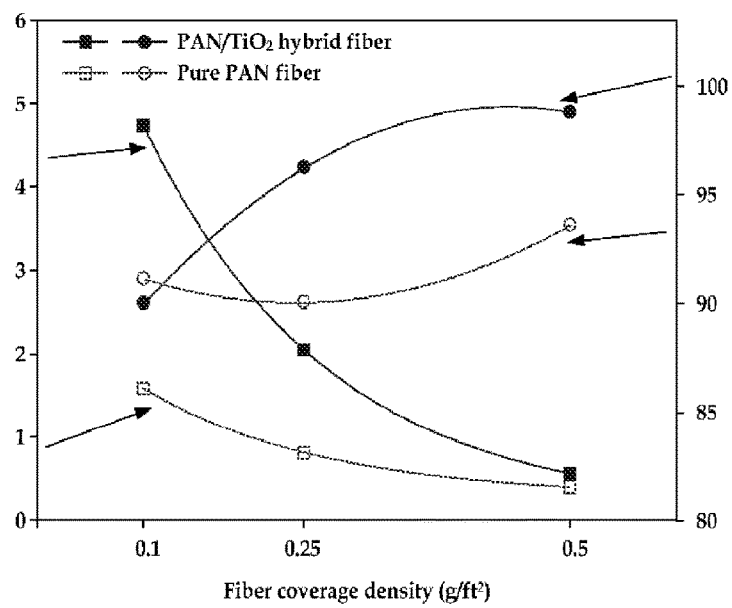
FIG. 13 shows overall filtration efficiency (particle size 0.1-1.0 μm) according to different fiber masses on the cellulose substrates and their pore diameters.

In some instances, overall filtration efficiency depends at least in part on the fiber coverage density on the bare filter and the presence of TiO₂ particles in the fibers. The mean pore diameter (measured by CFP) and the overall average filtration efficiency, which was measured with the particle sizes of 0.1 to 1.0 μm, are plotted in FIG. 13, along with the fiber coverage density for one embodiment. In this embodiment, the pure PAN nanofibrous filters show smaller pore diameter than their counterparts with PAN/TiO₂ hybrid nanofibers. For example, in the highest fiber coverage density (0.5 g/ft²), two types of filter media have a similar mean pore diameter that is small (below 1.0 μm), whereas filters with lower fiber coverage densities (0.1 and 0.25 g/ft²) show a large difference in the mean pore diameter. In this embodiment, the filtration efficiency of the PAN/TiO₂ hybrid nanofibrous filter media is higher than the pure PAN system except for the lowest fiber coverage density (0.1 g/ft²), even though the PAN/TiO₂ hybrid nanofibrous filters have a larger pore diameter. In the case of the 0.1 g/ft² fiber coverage density, the mean pore sizes of the pure system and the hybrid system are approximately 1.5 and 4.8 μm, respectively, indicating that the pure system has smaller pores in this embodiment. Here, the overall filtration efficiency of particles with size 0.1-1.0 μm shows very similar results. In the case of the 0.25 g/ft² and 0.5 g/ft² fiber coverage densities, the hybrid system shows higher filtration efficiency than the pure system. The nanoparticles (e.g., TiO₂) of the hybrid fibers are one factor that affects the filtration efficiency in some instances. For example, in an embodiment presented herein the filtration ability of the hybrid nanofibrous filter media (comprising nanoparticles) is considerably higher than the pure PAN system, even though in this instance the fiber coverage density of the pure PAN filter is 0.5 g/ft² and only 0.25 g/ft² for the hybrid media. If it were not for the effect of TiO₂ particles attracting the KCl particles, the filtration efficiency would have sharply decreased with the addition of the TiO₂ particles to the fibers in this instance because the hybrid nanofibrous filter media have larger pore sizes than their pure PAN counterparts. Thus, in some instances, the fiber coverage density and the presence of TiO₂ particles in the nanofibers are two factors in the control of filtration efficiency. It should be noted that as the TiO₂ particles were incorporated into the fibers, the fiber coverage density decreased, compared with the pure PAN fibers. In some instances, TiO₂ particles in the PAN/TiO₂ hybrid fibers contributed to enhance filtration efficiency with much less pressure drop.

In one aspect, the pore properties of the filters are considered a factor that can influence the filtration efficiency. Filters with smaller pore sizes are generally expected to have higher filtration efficiency. As described herein, CFP is used to characterize the PAN and PAN/TiO₂ nanofibrous filter media in some instances. The PSD shifted towards smaller pore diameters when the fiber coverage density was increased from 0.1 g/ft² to 0.5 g/ft² for both the filters covered with the PAN fibers and the filters covered with PAN/TiO₂ fibers in some embodiments. When the PSD was compared for the filter media having equal fiber coverage density but differing in the presence or absence of TiO₂ nanoparticles, it was found that the filter media with PAN/TiO₂ hybrid nanofibers had a larger average pore size than the pure PAN filters in some embodiments. In one aspect, the filtration efficiency is expected to be greater in the PAN nanofibrous filters due to their smaller pore sizes. However, as described in some embodiments herein, PAN/TiO₂ hybrid nanofibrous filters are notably more effective at filtering smaller, harder-to-catch particles. For some embodiments having high fiber coverage density (e.g., 0.5 g/ft²), the filtration has a high efficiency (over 98%), regardless of particle size. Without limitation, one possible reason for the superior filtration efficiency of PAN/TiO₂ hybrid filter is electrostatic interactions between the nanoparticles (e.g., TiO₂) and the particles to be filtered (e.g., KCl).

EXAMPLES

Example 1

Materials

Polyacrylonitrile (PAN) (Mw 150,000) and Dimethylformamide (DMF) were purchased from Sigma-Aldrich Co. The anatase TiO2 with a particle size ranging 5-10 nm was supplied by Samsung Co. (Korea). The cellulose bare filter media used in the examples was provided by Clark Filter Inc. (USA). The fiber diameters of the bare filter ranged between 20 μm and 50 μm.

Example 2

Fabrication of Nanofibers and Nanofibrous Filter Media

Pure PAN solution and three PAN/TiO2 hybrid solutions were prepared as shown in Table 3. First, three different volume percents of TiO2 nanoparticles (PAN/TiO2=97:3, 92.5:7.5, 87:13 v/v %) were dispersed in 2 mL of DMF with a vortex, respectively. PAN polymers were dissolved in DMF at 100° C. for 4 hours and each TiO2/DMF solution was then added to the PAN/DMF solution to give overall 10 wt % PAN in DMF. The solutions were then electrospun onto a metal plate covered with aluminum foil so that four nanofiber mats were prepared for characterization. Pure PAN solution and PAN/TiO2 (7.5 v %) solution were electrospun onto 3"×3" commercial cellulose filters (bare filter) in various fiber masses for the nanofibrous filter media. Three bare filters were coated with nanofibers from the pure PAN solution and another three bare filters with nanofibers from the PAN/TiO₂ hybrid solution, in fiber masses of 0.1, 0.25 and 0.5 g/ft². Electrospinning was performed using an 18 gauge needle with a flow rate of 0.025 mL/min. The potential difference applied between the needle and collector plate was 15 kV, and the distance between the plate and the tip of the needle was 13 cm.

TABLE 3

Exemplary fluid stock recipes for the electrospun nanofibers.

| Sample name | Volume ratio (%) | |
| --- | --- | --- |
| (volume % of TiO₂) | PAN | TiO₂ |
| Pure PAN | 100 | — |
| PAN/TiO₂ (3.0 v %) | 97.0 | 3.0 |

TABLE 3-continued

Exemplary fluid stock recipes for the electrospun nanofibers.

| Sample name | Volume ratio (%) | |
|---|---|---|
| (volume % of TiO$_2$) | PAN | TiO$_2$ |
| PAN/TiO$_2$ (7.5 v %) | 92.5 | 7.5 |
| PAN/TiO$_2$ (13 v %) | 87.0 | 13.0 |

Example 3

Characterization of Nanofibers and Nanofibrous Filter Media by SEM

The morphology of the electrospun fibers and the surface of the nanofibrous membrane before and after filtration testing were examined with a Leica 440 scanning electron microscope (SEM) after being coated with Au—Pd. The diameter of the spun fibers was measured using Image analysis software (ImageJ 1.41).

Example 4

Characterization of Nanofibers and Nanofibrous Filter Media by Electron Micropore Analyzer (EMPA)

The presence of TiO2 nanoparticles in the as-spun fibers was confirmed using an electron microprobe analyzer (EMPA, Jeol Model 8900R). EMPA was used in the wavelength dispersive spectrometer mode for TiO2 mapping. As the TiO2 particles are present in the PAN/TiO2 hybrid fibers, the TiO2 map directly indicates the location of the TiO2 particles in the as-spun fibers.

Example 5

X-Ray Diffraction Measurement (XRD)

XRD measurements were performed to confirm the presence of TiO2 nanoparticles in the as-spun fibers and their influence on PAN crystallization by a Scintag Theta-theta X-ray Diffractometer (nickel-filtered CuKα radiation, λ=1.54 A°) operating at 45 kV and 44 mA. All data were collected in the 2θ range of 5-45° with a step of 0.03° and a scanning rate of 5°/min.

Example 6

Thermally Stimulated Current Measurements (TSC)

The electrical charge potential of the as-spun fibers was measured by a TSC instrument (Novocontrol tech. GmbH & Co., Germany). Two TSC methods were adopted to probe the current behaviors of the as-spun fibers. In the first method, the measurement was performed at the ramping temperature 7° C./min from 10° C. to 30° C. in the absence of an externally applied voltage. In the second method, the surface current charges of the as-spun fibers were evaluated without applied voltage so that TSC spectra at a fixed temperature (19° C.) were recorded for 10 min. During the measurement, the specimen of the as-spun fibers was sandwiched between two pieces of 20 μm Teflon film to prevent the contact between the two electrodes. The thickness of as-spun fibers was approximately 20 μm.

Example 7

Capillary Flow Porometry

A capillary flow porometry (Porous Media Inc., NY) was used to characterize the pore size and pore size distribution of the fibrous filter media. The fibrous filter media were cut into a diameter of 2.5 cm for porometry measurement. In this method, pores of the filter media were filled with a few drops of a wetting liquid (SilWick fluid, surface tension 20.1 dyne/cm). The liquid in the pores (wet sample) was removed by pressure-driven air flowing. The larger pores were emptied at the lowest pressure and smaller pores were gradually emptied with increasing pressure. The air flow was maximized when the sample was dry. The difference in air pressures and air flow rates between the wet and dry sample were measured. The relationship between pressure and flow rate for the dry and wet sample was used to calculate the mean pore diameter and the pore size distribution (PSD).

Example 8

Filtration Test

The filtration test of nanofibrous filter media was performed with a multi-channel filtration test device (at the Environmental Systems Laboratory of Syracuse University, NY). As can be seen in FIG. 1, the device consists of five 2" diameter tubes (or channels) that separately hold each filter specimen with diameter of 2 inches. The device is attached to a particle generator which generates KCl particles of 0.1-2.0 μm in diameter (not seen in FIG. 1). The mixing box at the bottom of the device creates a substantially uniform distribution of the generated KCl particles into each upstream channel. An air stream with KCl particles is passed through the filter at a surface air velocity of 80 cm/s. A particle counter is used to measure particle concentration, first upstream of the filter for 3 minutes and then downstream of the filter for another 3 minutes. In this example, the six nanofibrous filter media were subjected to a filtration efficiency test.

Example 9

Nanoparticle in Polymer Matrix—Nanofibers (with Gas Assistance)

0.5 grams of preformed nanoparticles (100 nm average diameter), the metal component, is suspended in 20 ml of 1 molar acetic acid solution with X-100 surfactant. The solution is stirred for 2 hours to create a suspension of nanoparticles.

In a second solution, 1 gram of 99.7% hydrolyzed polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

The nanoparticle suspension is then combined with the PVA solution to create a fluid stock. In order to distribute the nanoparticles substantially evenly in the fluid stock, the nanoparticle suspension is added gradually to the polymer solution while being continuously vigorously stirred for 2 hours. The mass ratio of nanoparticles to polymer for the fluid feed is 1:4.

The fluid stock is co-axially electrospun with gas using a coaxial needle apparatus similar to the one depicted in FIG.

19. The center conduit contains fluid stock and the outer conduit contains air. The electrospun hybrid fluid stock (hybrid as-spun nanofiber) is optionally heat treated for 2 hours at 600° C. in an inert atmosphere (e.g., argon). FIG. 18 illustrates a TEM image of such a nanofiber and the non-aggregated nanoparticles therein.

Example 10

Nanoparticle in Polymer Matrix—Nanofibers (without Gas Assistance)

Using a procedure similar to that set forth in Example, nanocomposite nanofibers comprising nanoparticles were prepared without gas assistance. FIG. 17 illustrates various TEM images of such (non-thermally treated) nanofibers.

We claim:

1. A method for preparing a nanofiber or non-woven mat thereof, the method comprising gas-assisted electrospinning a fluid stock by providing the fluid stock to a first conduit of an electrospinning apparatus and a gas to a second conduit of an electrospinning apparatus, the first and second conduit being aligned along a common axis, the fluid stock comprising organic polymer and a plurality of nanoparticles, the weight ratio of the plurality of nanoparticles to polymer being at least 1:2, the nanofiber produced thereby and comprising non-aggregated nanoparticles embedded in a continuous matrix.

2. The method of claim 1, wherein the non-aggregated nanoparticles embedded in the continuous matrix are charged.

3. The method of claim 2, wherein the standard deviation of charge density of the nanofiber is at least 300% of the net charge density of the nanofiber.

4. The method of claim 1, wherein the non-aggregated nanoparticles embedded in the continuous matrix are chargeable.

5. The method of claim 1, wherein the weight ratio of the plurality of nanoparticles to polymer being at least 1:1.

6. The method of claim 1, wherein the plurality of nanoparticles comprises metal, metal oxide, or ceramic.

7. The method of claim 6, wherein the plurality of nanoparticles comprises metal oxide.

8. The method of claim 7, wherein the metal oxide is selected from the group consisting of MgO, $TiO_2$, CuO, ZnO and $ZrO_2$.

9. The method of claim 1, wherein the gas-assisted electrospinning comprises expelling a stream of gas surrounding a fluid stock jet.

10. The method of claim 1, wherein the gas-assisted electrospinning comprises expelling a stream of gas in along with a fluid stock jet, the stream of gas having a velocity of at least 60 cm/s.

11. The method of claim 1, wherein the method further comprises thermally treating the nanofiber.

12. The method of claim 1, wherein the polymer comprises polyacrylonitrile (PAN) or polyvinyl alcohol (PVA).

13. The method of claim 1, wherein fewer than 50% of all nanoparticles present in the nanofiber are aggregated.

14. The method of claim 13, wherein fewer than 25% of all nanoparticles present in the nanofiber are aggregated.

15. The method of claim 1, wherein the average size of the plurality of nanoparticles is 1 nm to 200 nm.

16. The method of claim 15, wherein the average size of the plurality of nanoparticles is 1 nm to 100 nm.

17. The method of claim 16, wherein the average size of the plurality of nanoparticles is 3 nm to 50 nm.

18. The nanofiber of claim 1, wherein the nanofiber has a diameter of at most 1,000 nm and an aspect ratio of at least 100.

19. The method of claim 1, wherein the continuous matrix is a polymer matrix.

* * * * *